United States Patent
Noguchi et al.

(10) Patent No.: US 11,475,767 B2
(45) Date of Patent: Oct. 18, 2022

(54) INFORMATION-PROCESSING DEVICE, VEHICLE CONTROL DEVICE, INFORMATION-PROCESSING METHOD, AND STORAGE MEDIUM

(71) Applicant: HONDA MOTOR CO., LTD., Tokyo (JP)

(72) Inventors: Junpei Noguchi, Wako (JP); Chie Sugihara, Tokyo (JP); Ryoma Taguchi, Tokyo (JP); Yuta Takada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 205 days.

(21) Appl. No.: 16/857,207

(22) Filed: Apr. 24, 2020

(65) Prior Publication Data
US 2020/0365019 A1 Nov. 19, 2020

(30) Foreign Application Priority Data
May 15, 2019 (JP) .............................. JP2019-091962

(51) Int. Cl.
*G08G 1/00* (2006.01)
*G08G 1/065* (2006.01)
(Continued)

(52) U.S. Cl.
CPC .............. *G08G 1/065* (2013.01); *G08G 1/01* (2013.01); *G08G 1/207* (2013.01); *B60W 30/06* (2013.01); *B60W 60/0025* (2020.02)

(58) Field of Classification Search
CPC .......... G08G 1/065; G08G 1/207; G08G 1/01; G08G 1/04; G08G 1/142; G08G 1/09623; G08G 1/149; G08G 1/146; G08G 1/0137; B60W 60/0025; B60W 30/06; B60W 2530/10; B60W 2540/049; G01C 21/20; G01C 21/3407; B62D 15/0285; G07C 9/00; G05D 27/02

See application file for complete search history.

(56) References Cited

U.S. PATENT DOCUMENTS

| 10,373,226 B1 * | 8/2019 | Russell .............. G06Q 30/0635 |
| 2006/0227010 A1 | 10/2006 | Berstis et al. |
| 2017/0313305 A1 | 11/2017 | Irion et al. |

FOREIGN PATENT DOCUMENTS

| CN | 106997665 | 8/2017 |
| CN | 109594828 | 4/2019 |

(Continued)

OTHER PUBLICATIONS

Chinese Office Action for Chinese Patent Application No. 202010326215.8 dated Jan. 6, 2022.
(Continued)

*Primary Examiner* — Ian Jen
(74) *Attorney, Agent, or Firm* — Amin, Turocy & Watson, LLP

(57) ABSTRACT

An information-processing device includes a first controller configured to determine the number of users using a vehicle that enters or leaves a parking lot or a weight of the vehicle and a second controller configured to determine a position where the vehicle is stopped within a predetermined area of the parking lot on the basis of the number of users or the weight determined by the first controller.

17 Claims, 18 Drawing Sheets

(51) Int. Cl.
*G08G 1/01* (2006.01)
*B60W 60/00* (2020.01)
*B60W 30/06* (2006.01)

(56) References Cited

FOREIGN PATENT DOCUMENTS

| | | |
|---|---|---|
| JP | 2005-031766 | 2/2005 |
| JP | 2011-054116 | 3/2011 |
| JP | 2015-176468 | 10/2015 |
| JP | 2015-219811 | 12/2015 |
| JP | 2018-145655 | 9/2018 |
| JP | 2018-156641 | 10/2018 |
| JP | 2018-181060 | 11/2018 |
| JP | 2019-003368 | 1/2019 |
| WO | 2018/230640 | 12/2018 |
| WO | 2019/065698 | 4/2019 |
| WO | 2019/082774 | 5/2019 |

OTHER PUBLICATIONS

Japanese Office Action for Japanese Patent Application No. 2019-091962 dated Jun. 7, 2022.
Chinese Notice of Allowance for Chinese Patent Application No. 202010326215.8 dated Aug. 1, 2022.

\* cited by examiner

446

| USER ID | VEHICLE ID | USE TIME | NUMBER OF USERS | ... |
|---|---|---|---|---|
| AAAA | KKKK | 11/17 09:30:00 | 1 | ... |
| BBBB | LLLL | 11/17 12:45:00 | 4 | ... |
| CCCC | MMMM | 11/17 20:00:00 | 2 | ... |
| ... | ... | ... | ... | ... |

INFORMATION-PROCESSING DEVICE, VEHICLE CONTROL DEVICE, INFORMATION-PROCESSING METHOD, AND STORAGE MEDIUM

CROSS-REFERENCE TO RELATED APPLICATION

This application is based upon and claims the benefit of priority from Japanese Patent Application No. 2019-091962, filed May 15, 2019, the entire content of which is incorporated herein by reference.

BACKGROUND

Field of the Invention

The present invention relates to an information-processing device, a vehicle control device, an information-processing method, and a storage medium.

Description of Related Art

In recent years, research has been conducted on automated driving vehicles. Technology for using a certain area of a parking lot as a dedicated area for a getting-out process for a time period in which a use frequency is high in the getting-out process and a dedicated area for a getting-into process for a time period in which a use frequency is high in the getting-into process is also known (for example, see Japanese Unexamined Patent Application, First Publication No. 2018-145655).

SUMMARY

In general, time periods required for getting into and out of a vehicle have a correlation with the number of users using the vehicle. However, in the conventional technology, no consideration has been given to the fact that a use time period of the parking lot varies with the number of users and a limited area of the parking lot cannot be effectively utilized.

Aspects of the present invention provide an information-processing device, a vehicle control device, an information-processing method, and a storage medium capable of sufficiently effectively utilizing a limited area of a parking lot.

An information-processing device, a vehicle control device, an information-processing method, and a storage medium according to the present invention adopt the following configurations.

According to aspect (1) of the present invention, an information-processing device is provided, including: a first controller configured to determine the number of users using a vehicle that enters or leaves a parking lot or a weight of the vehicle; and a second controller configured to determine a position where the vehicle is stopped within a predetermined area of the parking lot on the basis of the number of users or the weight determined by the first controller.

According to aspect (2), in the information-processing device of the above-described aspect (1), a plurality of lanes are provided in the area, the second controller determines a first lane as a stop position of the vehicle when the number of users or the weight is less than a threshold value, and the second controller determines a second lane having a longer stop time period of the vehicle than the first lane as the stop position of the vehicle when the number of users or the weight is greater than or equal to the threshold value.

According to aspect (3), in the information-processing device of the above-described aspect (1), a plurality of lanes are provided in the area, the second controller determines a first lane as a stop position of the vehicle when a stop time period of the vehicle according to the number of users or the weight is less than a threshold value, and the second controller determines a second lane having a longer stop time period than the first lane as the stop position of the vehicle when the stop time period of the vehicle according to the number of users or the weight is greater than or equal to the threshold value.

According to aspect (4), the information-processing device of the above-described aspect (2) or (3) further includes a third controller configured to determine that a penalty is to be given to a user of a vehicle that has performed a delay action in the lane.

According to aspect (5), in the information-processing device of the above-described aspect (4), the third controller determines that the penalty is to be given to the user of the vehicle that has performed the delay action in which at least a stop time period on the first lane is longer than or equal to a predetermined time period.

According to aspect (6), in the information-processing device of the above-described aspect (5), the third controller restricts the penalty from being given to a user of a vehicle that has performed the delay action in the first lane when there is no other vehicle following a vehicle stopped in the first lane.

According to aspect (7), in the information-processing device of the above-described aspect (5), the third controller determines that a heavier penalty is to be given to a user of a vehicle that has performed the delay action when a stop time period on the lane is longer.

According to aspect (8), in the information-processing device of any one of the above-described aspects (4) to (7), the third controller determines that a penalty heavier than a penalty given to a user of a vehicle that has performed the delay action in the second lane is to be given to a user of a vehicle that has performed the delay action in the first lane.

According to aspect (9), the information-processing device of any one of the above-described aspects (2) to (8) further includes a fourth controller configured to determine a ratio between the number of first lanes and the number of second lanes among the plurality of lanes on the basis of a use situation of each of the plurality of lanes.

According to aspect (10), the information-processing device of any one of the above-described aspects (2) to (9) further includes a fourth controller configured to determine threshold values of a stop time period on the first lane and a stop time period on the second lane on the basis of a use situation of each of the plurality of lanes.

According to aspect (11), the information-processing device of any one of the above-described aspects (1) to (10) further includes a communicator configured to communicate with an external device, wherein the first controller determines the number of users or the weight on the basis of first information when the communicator has received the first information about a weight of a vehicle that enters the parking lot.

According to aspect (12), the information-processing device of any one of the above-described aspects (1) to (11) further includes a communicator configured to communicate with an external device, wherein the first controller determines the number of users on the basis of second information when the communicator has received second information about the number of users scheduled to get into a vehicle that enters the parking lot.

According to aspect (13), in the information-processing device of any one of the above-described aspects (1) to (12), the second controller determines a position where the vehicle is stopped within the area on the basis of a time period required when the user gets into the vehicle or a time period required when the user gets out of the vehicle at a timing before the vehicle enters the parking lot.

According to aspect (14) of the present invention, a vehicle control device is provided, including: a recognizer configured to recognize a surrounding situation of a host vehicle; and a driving controller configured to cause the host vehicle to stop in a predetermined area of a parking lot by controlling at least one of steering and a speed of the host vehicle on the basis of the situation recognized by the recognizer, wherein the driving controller determines a position where the host vehicle is stopped within the area on the basis of the number of users using the host vehicle or a weight of the host vehicle.

According to aspect (15), in the vehicle control device of the above-described aspect (14), a plurality of lanes are provided in the area, and the driving controller causes the host vehicle to stop in a first lane when the number of users or the weight is less than a threshold value and causes the host vehicle to stop in a second lane having a longer stop time period of the vehicle than the first lane when the number of users or the weight is greater than or equal to the threshold value.

According to another aspect (16) of the present invention, an information-processing method is provided, including: determining, by a computer, the number of users using a vehicle that enters or leaves a parking lot or a weight of the vehicle; and determining, by the computer, a position where the vehicle is stopped within a predetermined area of the parking lot on the basis of the number of users or the weight that has been determined.

According to another aspect (17) of the present invention, a computer-readable non-transitory storage medium is provided that stores a program for causing a computer to: determine the number of users using a vehicle that enters or leaves a parking lot or a weight of the vehicle; and determine a position where the vehicle is stopped within a predetermined area of the parking lot on the basis of the number of users or the weight that has been determined.

According to any one of aspects (1) to (17), it is possible to sufficiently effectively use a limited area of a parking lot.

DETAILED DESCRIPTION OF THE INVENTION

Hereinafter, embodiments of an information-processing device, a vehicle control device, an information-processing method, and a storage medium according to the present invention will be described with reference to the drawings.

First Embodiment

[Overall Configuration]

Figure 1:
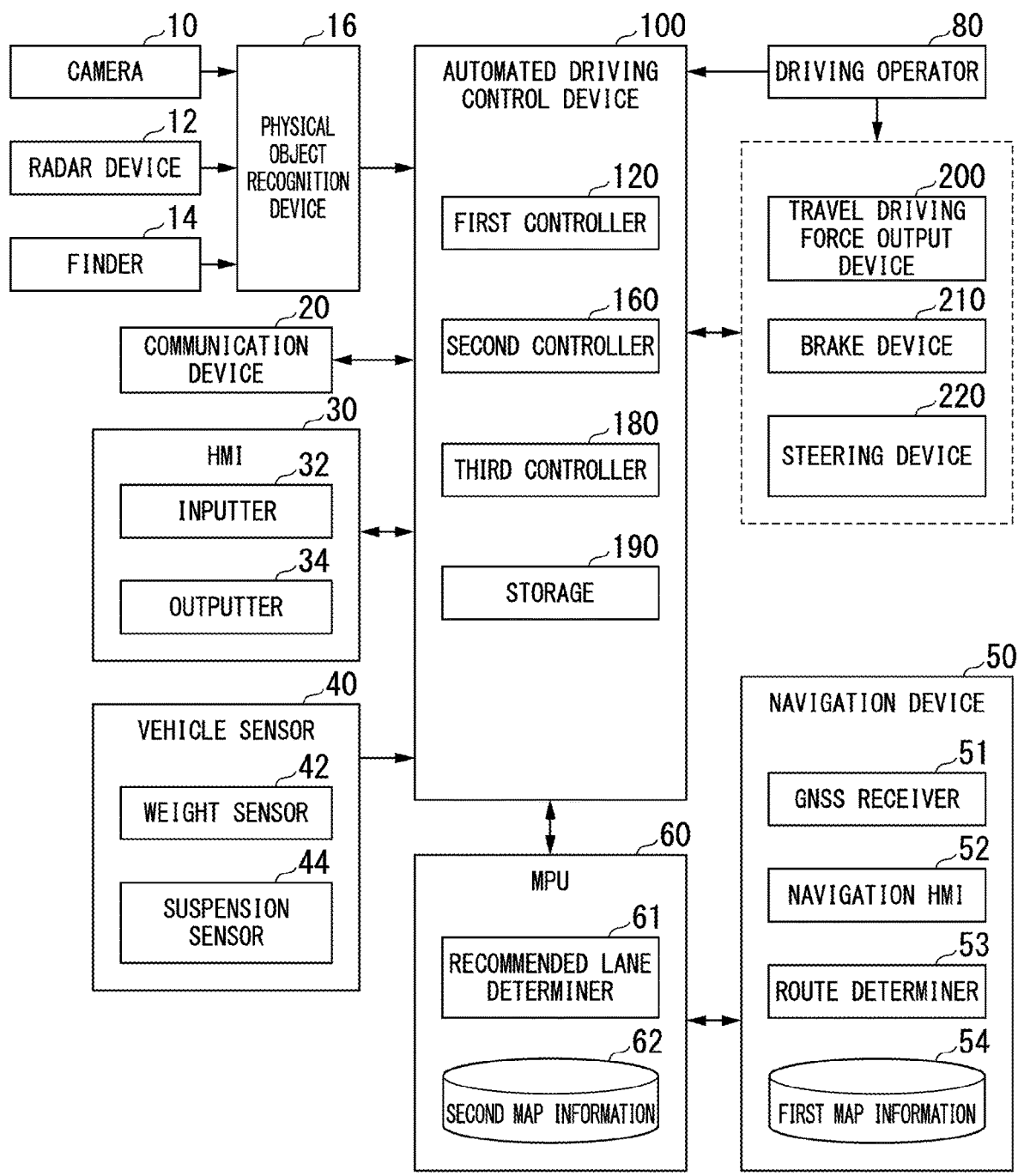
FIG. 1 is a configuration diagram of a vehicle system using a vehicle control device according to a first embodiment.

FIG. 1 is a configuration diagram of a vehicle system 1 using the vehicle control device according to an embodiment. A vehicle equipped with the vehicle system 1 is, for example, a vehicle such as a two-wheeled vehicle, a three-wheeled vehicle, or a four-wheeled vehicle. A driving source of these vehicles is an internal combustion engine such as a diesel engine or a gasoline engine, an electric motor, or a combination thereof. The electric motor operates using electric power generated by a power generator connected to the internal combustion engine, or discharge power of a secondary battery or a fuel cell.

For example, the vehicle system 1 includes a camera 10, a radar device 12, a finder 14, a physical object recognition device 16, a communication device 20, a human machine interface (HMI) 30, a vehicle sensor 40, a navigation device 50, a map-positioning unit (MPU) 60, a driving operator 80, an automated driving control device 100, a travel driving force output device 200, a brake device 210, and a steering device 220. Such devices and equipment are connected to each other by a multiplex communication line such as a controller area network (CAN) communication line, a serial communication line, or a wireless communication network. The configuration shown in FIG. 1 is merely an example and parts of the configuration may be omitted or other configurations may be further added.

For example, the camera 10 is a digital camera using a solid-state imaging element such as a charge-coupled device (CCD) or a complementary metal-oxide semiconductor (CMOS). The camera 10 is attached to any position on the vehicle (hereinafter referred to as a host vehicle M) in which the vehicle system 1 is mounted. When the view in front of the host vehicle M is imaged, the camera 10 is attached to an upper part of a front windshield, a rear surface of a rearview mirror, or the like. For example, the camera 10 periodically and iteratively images the surroundings of the host vehicle M. The camera 10 may be a stereo camera.

The radar device 12 radiates radio waves such as millimeter waves around the host vehicle M and detects at least a position (a distance to and a direction) of a physical object by detecting radio waves (reflected waves) reflected by the physical object. The radar device 12 is attached to any position on the host vehicle M. The radar device 12 may detect a position and speed of the physical object in a frequency-modulated continuous wave (FM-CW) scheme.

The finder 14 is a light detection and ranging (LIDAR) finder. The finder 14 radiates light to the vicinity of the host vehicle M and measures scattered light. The finder 14 detects a distance to an object on the basis of time from light emission to light reception. The radiated light is, for example, pulsed laser light. The finder 14 is attached to any position on the host vehicle M.

The physical object recognition device 16 performs a sensor fusion process on detection results from some or all of the camera 10, the radar device 12, and the finder 14 to recognize a position, a type, a speed, and the like of a physical object. The physical object recognition device 16 outputs recognition results to the automated driving control device 100. The physical object recognition device 16 may output detection results of the camera 10, the radar device 12, and the finder 14 to the automated driving control device 100 as they are. The physical object recognition device 16 may be omitted from the vehicle system 1.

The communication device 20 communicates with another vehicle present in the vicinity of the host vehicle M, a parking lot management device (to be described below), or various types of server devices using, for example, a cellular network or a Wi-Fi network, Bluetooth (registered trademark), dedicated short-range communication (DSRC), or the like.

The HMI 30 includes an inputter 32 and an outputter 34. The inputter 32 receives an input operation by the occupant of the host vehicle M. For example, the inputter 32 includes a touch panel, a switch, a key, and the like. The outputter 34 outputs various types of information to the occupant of the host vehicle M. For example, the outputter 34 includes a display, a speaker, and the like. The display of the outputter 34 may be configured integrally with the touch panel of the inputter 32.

The vehicle sensor 40 includes a vehicle speed sensor configured to detect the speed of the host vehicle M, an acceleration sensor configured to detect acceleration, a yaw rate sensor configured to detect an angular speed around a vertical axis, a direction sensor configured to detect a direction of the host vehicle M, and the like. Further, the vehicle sensor 40 includes a weight sensor 42 that detects a weight of the host vehicle M, and a suspension sensor 44 that detects a stroke (an amount of expansion/contraction) of the suspension of the host vehicle M. The vehicle sensor 40 outputs information indicating various types of detection results to the automated driving control device 100.

For example, the navigation device 50 includes a global navigation satellite system (GNSS) receiver 51, a navigation HMI 52, and a route determiner 53. The navigation device 50 stores first map information 54 in a storage device such as a hard disk drive (HDD) or a flash memory. The GNSS receiver 51 identifies a position of the host vehicle M on the basis of a signal received from a GNSS satellite. The position of the host vehicle M may be identified or corrected by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. For example, the route determiner 53 determines a route (hereinafter referred to as a route on a map) from the position of the host vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by the link. The first map information 54 may include a curvature of a road, point of interest (POI) information, and the like. The route on the map is output to the MPU 60. The navigation device 50 may perform route guidance using the navigation HMI 52 on the basis of the route on the map. The navigation device 50 may be implemented, for example, according to a function of a terminal device such as a smartphone or a tablet terminal possessed by the occupant. The navigation device 50 may transmit a current position and a destination to a navigation server via the communication device 20 and acquire a route equivalent to the route on the map from the navigation server.

For example, the MPU 60 includes a recommended lane determiner 61 and stores second map information 62 in a storage device such as an HDD or a flash memory. The recommended lane determiner 61 divides the route on the map provided from the navigation device 50 into a plurality of blocks (for example, divides the route every 100 [m] in a traveling direction of the vehicle), and determines a recommended lane for each block with reference to the second map information 62. The recommended lane determiner 61 determines what number lane the vehicle travels in from the left. The recommended lane determiner 61 determines the recommended lane so that the host vehicle M can travel along a reasonable route for traveling to a branching destination when there is a branch point in the route on the map.

The second map information 62 is map information which has higher accuracy than the first map information 54. For example, the second map information 62 includes information about a center of a lane, information about a boundary of a lane, and the like. The second map information 62 may include road information, traffic regulations information, address information (an address/postal code), facility information, telephone number information, and the like. The second map information 62 may be updated at any time when the communication device 20 communicates with another device.

For example, the driving operator 80 includes an accelerator pedal, a brake pedal, a shift lever, a steering wheel, a steering wheel variant, a joystick, and other operators. A sensor configured to detect an amount of operation or the presence or absence of an operation is attached to the driving operator 80, and a detection result thereof is output to the automated driving control device 100 or some or all of the travel driving force output device 200, the brake device 210, and the steering device 220.

The automated driving control device 100 includes, for example, a first controller 120, a second controller 160, a third controller 180, and a storage 190. Some or all of the first controller 120, the second controller 160, and the third controller 180 are implemented, for example, by a hardware processor such as a central processing unit (CPU) executing a program (software). Some or all of these components are implemented by hardware (a circuit including circuitry) such as large-scale integration (LSI), an application-specific integrated circuit (ASIC), a field-programmable gate array (FPGA), or a graphics-processing unit (GPU) or may be implemented by software and hardware in cooperation. The program may be pre-stored in a storage device such as an HDD or a flash memory of the storage 190 or may be stored in a removable storage medium such as a DVD or a CD-ROM and installed in the HDD or the flash memory of the storage 190 when the storage medium is mounted in a drive device.

The storage 190 is implemented by, for example, an HDD, a flash memory, an electrically-erasable programmable read only memory (EEPROM), a read-only memory (ROM), a random-access memory (RAM), or the like. The storage 190 stores, for example, a program or the like read and executed by the processor.

Figure 2:
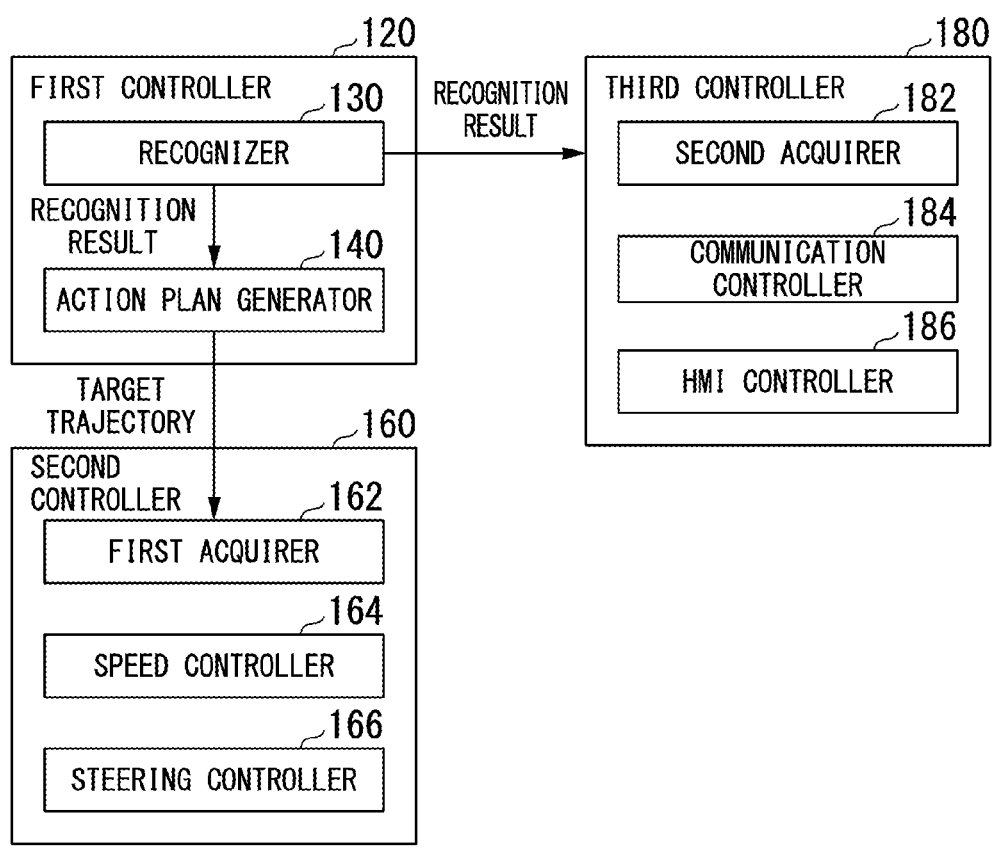
FIG. 2 is a functional configuration diagram of a first controller, a second controller, and a third controller.

FIG. 2 is a functional configuration diagram of the first controller 120, the second controller 160, and the third controller 180. The first controller 120 includes, for example, a recognizer 130, and an action plan generator 140.

For example, the first controller 120 implements a function based on artificial intelligence (AI) and a function based on a previously given model in parallel. For example, an "intersection recognition" function may be implemented by executing intersection recognition based on deep learning or the like and recognition based on previously given conditions (signals, road markings, or the like, with which pattern matching is possible) in parallel and performing comprehensive evaluation by assigning scores to both the recognitions. Thereby, the reliability of automated driving is secured.

The recognizer 130 recognizes a surrounding situation of the host vehicle M on the basis of information input from the camera 10, the radar device 12, and the finder 14 via the physical object recognition device 16, i.e., sensor-fusion detection results. For example, the recognizer 130 recognizes a state such as a position, velocity, or acceleration of a physical object present in the vicinity of the host vehicle M as the surrounding situation. The physical object recognized as the surrounding situation includes, for example, a moving body such as a pedestrian or another vehicle or a stationary body such as a construction tool. For example, the position of the physical object is recognized as a position on absolute coordinates with a representative point (a center of gravity, a driving shaft center, or the like) of the host vehicle M as the origin and is used for control. The position of the physical object may be represented by a representative point such as a center of gravity or a corner of the physical object or may be represented by an area having a spatial extent. The "state" of a physical object may include acceleration or jerk of the physical object or an "action state" (for example, whether or not a lane change is being made or intended).

For example, the recognizer 130 recognizes a lane in which the host vehicle M is traveling (hereinafter referred to as a host vehicle lane), an adjacent lane adjacent to the host vehicle lane, or the like as a surrounding situation. For example, the recognizer 130 recognizes the host vehicle lane or the adjacent lane by comparing a pattern of a road dividing line (for example, an arrangement of solid lines and broken lines) obtained from the second map information 62 with a pattern of road dividing lines in the vicinity of the host vehicle M recognized from an image captured by the camera 10. The recognizer 130 may recognize the host vehicle lane or the adjacent lane by recognizing a traveling path boundary (a road boundary) including a road dividing line, a road shoulder, a curb stone, a median strip, a guardrail, or the like as well as a road dividing line. In this recognition, a position of the host vehicle M acquired from the navigation device 50 or a processing result of the INS may be added. The recognizer 130 may recognize a sidewalk, a stop line (including a temporary stop line), an obstacle, red traffic light, a toll gate, a road structure, and other road events.

When the host vehicle lane is recognized, the recognizer 130 recognizes a relative position or orientation of the host vehicle M with respect to the host vehicle lane. For example, the recognizer 130 may recognize a gap of a reference point of the host vehicle M from the center of the lane and an angle formed by a vector indicating a traveling direction of the host vehicle M and a line connected to the center of the lane as a relative position and orientation of the host vehicle M related to the host vehicle lane. Alternatively, the recognizer 130 may recognize a position of the reference point of the host vehicle M related to one side end portion (a road dividing line or a road boundary) of the host vehicle lane or the like as a relative position of the host vehicle M related to the host vehicle lane.

The action plan generator 140 determines an event of automated driving in the route on which the recommended lane has been determined. The event of the automated driving is information that defines the form of behavior to be taken by the host vehicle M during the automated driving, i.e., a traveling aspect. The automated driving means that at least one of the speed and the steering of the host vehicle M is controlled or both thereof are controlled independently of the driving operation of the driver of the host vehicle M. On the other hand, the manual driving means that the steering of the host vehicle M is controlled by the driver of the host vehicle M operating the steering wheel and the speed of the host vehicle M is controlled by the driver operating the accelerator pedal or the brake pedal.

The events may include, for example, a parking event, a constant-speed traveling event, a following traveling event, a lane change event, a branching event, a merging event, an overtaking event, an avoidance event, a takeover event, and the like. The parking event is an event in which the occupant of the host vehicle M causes the host vehicle M to travel autonomously and park in the parking space as in valet parking without parking the host vehicle M in the parking space on his or her own. The constant-speed traveling event is an event for causing the host vehicle M to travel in the same lane at a constant speed. The following traveling event is an event for causing the host vehicle M to follow another vehicle (hereinafter referred to as a preceding vehicle) that is present within a predetermined distance (for example, within 100 [m]) in front of the host vehicle M and is closest to the host vehicle M. "Following" may be, for example, a traveling aspect for causing a relative distance (an inter-vehicle distance) between the host vehicle M and the preceding vehicle to be constantly maintained or a traveling aspect for causing the host vehicle M to travel in the center of the host vehicle lane in addition to causing the relative distance between the host vehicle M and the preceding vehicle to be constantly maintained. The lane change event is an event for causing the host vehicle M to make a lane change from the host vehicle lane to an adjacent lane. The branching event is an event for causing the host vehicle M to move to a lane of a branch road in a target direction at a branch point of a road. The merging event is an event for causing the host vehicle M to move to a lane of a main road at a merging point. The overtaking event is an event for causing the host vehicle M to make a lane change to a previous lane again after the host vehicle M temporarily makes a lane change to an adjacent lane and overtakes a preceding vehicle in the adjacent lane. The avoidance event is an event for causing the host vehicle M to perform at least one of braking and steering in order to avoid an obstacle in front of the host vehicle M. The takeover event is an event for ending automated driving and performing switching to manual driving, and the like.

The action plan generator 140 may change an event already determined for the current section or the next section to another event in accordance with the surrounding situation recognized by the recognizer 130 when the host vehicle M is traveling or determine a new event for the current section or the next section.

The action plan generator 140 generates a future target trajectory along which the host vehicle M is allowed to automatedly travel (independently of a driver's operation) in the traveling aspect defined by the event so that the host vehicle M can generally travel in the recommended lane determined by the recommended lane determiner 61 and further cope with a surrounding situation of the host vehicle M. The target trajectory includes, for example, a position element that determines a future position of the host vehicle M and a speed element that determines a future speed and acceleration of the host vehicle M.

For example, the action plan generator 140 determines a plurality of points (trajectory points) at which the host vehicle M is required to sequentially arrive as position elements of the target trajectory. The trajectory point is a point at which the host vehicle M is required to arrive for each predetermined traveling distance (for example, about several meters [m]). The predetermined traveling distance may be calculated, for example, according to a road distance at the time of traveling along the route.

The action plan generator 140 determines a target speed and target acceleration for each predetermined sampling time period (for example, about several tenths of a second [sec]) as speed elements of the target trajectory. The trajectory point may be a position at which the host vehicle M is required to arrive at the sampling time for each predetermined sampling time period. In this case, the target speed or the target acceleration is determined by a sampling time period and an interval between the trajectory points. The action plan generator 140 outputs information indicating the generated target trajectory to the second controller 160.

The second controller 160 controls some or all of the travel driving force output device 200, the brake device 210, and the steering device 220 so that the host vehicle M passes through the target trajectory generated by the action plan generator 140 at a scheduled time. That is, the second controller 160 causes the host vehicle M to be automatedly driven on the basis of the target trajectory generated by the action plan generator 140.

The second controller 160 includes, for example, a first acquirer 162, a speed controller 164, and a steering controller 166. A combination of the action plan generator 140 and the second controller 160 is an example of a "driving controller".

The first acquirer 162 acquires information of a target trajectory (trajectory points) generated by the action plan generator 140 and stores the information in the memory of the storage 190.

The speed controller 164 controls one or both of the travel driving force output device 200 and the brake device 210 on the basis of speed elements (for example, a target speed, target acceleration, and the like) included in the target trajectory stored in the memory.

The steering controller 166 controls the steering device 220 in accordance with a position element included in the target trajectory (for example, the curvature representing a degree of curve of a target trajectory or the like) stored in the memory.

For example, processes of the speed controller 164 and the steering controller 166 are implemented by a combination of feed-forward control and feedback control. As one example, the steering controller 166 executes feed-forward control according to the curvature of the road in front of the host vehicle M and feedback control based on a deviation of the host vehicle M from the target trajectory in combination.

The travel driving force output device 200 outputs a travel driving force (torque) for enabling the vehicle to travel to driving wheels. For example, the travel driving force output device 200 may include a combination of an internal combustion engine, an electric motor, a transmission, and the like, and a power electronic control unit (ECU) that controls the internal combustion engine, the electric motor, the transmission, and the like. The power ECU controls the above-described components in accordance with information input from the second controller 160 or information input from the driving operator 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the second controller 160 or the information input from the driving operator 80 so that brake torque according to a braking operation is output to each wheel. The brake device 210 may include a mechanism configured to transfer the hydraulic pressure generated by an operation of the brake pedal included in the driving operator 80 to the cylinder via a master cylinder as a backup. The brake device 210 is not limited to the above-described configuration and may be an electronically controlled hydraulic brake device configured to control the actuator in accordance with information input from the second controller 160 and transfer the hydraulic pressure of the master cylinder to the cylinder.

For example, the steering device 220 includes a steering ECU and an electric motor. For example, the electric motor changes a direction of steerable wheels by applying a force to a rack and pinion mechanism. The steering ECU drives the electric motor in accordance with the information input from the second controller 160 or the information input from the driving operator 80 to cause the direction of the steerable wheels to be changed.

The third controller 180 includes, for example, a second acquirer 182, a communication controller 184, and an HMI controller 186. The second acquirer 182 acquires information indicating a recognition result of the recognizer 130 or acquires information indicating a detection result of the vehicle sensor 40. The second acquirer 182 acquires various types of information from an external device such as the parking lot management device 400 via the communication device 20.

The communication controller 184 controls the communication device 20 so that the communication device 20 communicates with an external device. The HMI controller 186 controls the outputter 34 of the HMI 30 so that the outputter 34 outputs various types of information.

[Autonomous Parking Event-when Entering is Performed]

Hereinafter, a function of the action plan generator 140 that has executed the autonomous parking event will be described. The action plan generator 140 that has executed the autonomous parking event causes the host vehicle M to park in a parking space within a parking lot PA, for example, on the basis of information acquired from the parking lot management device 400 by the communication device 20.

Figure 3:
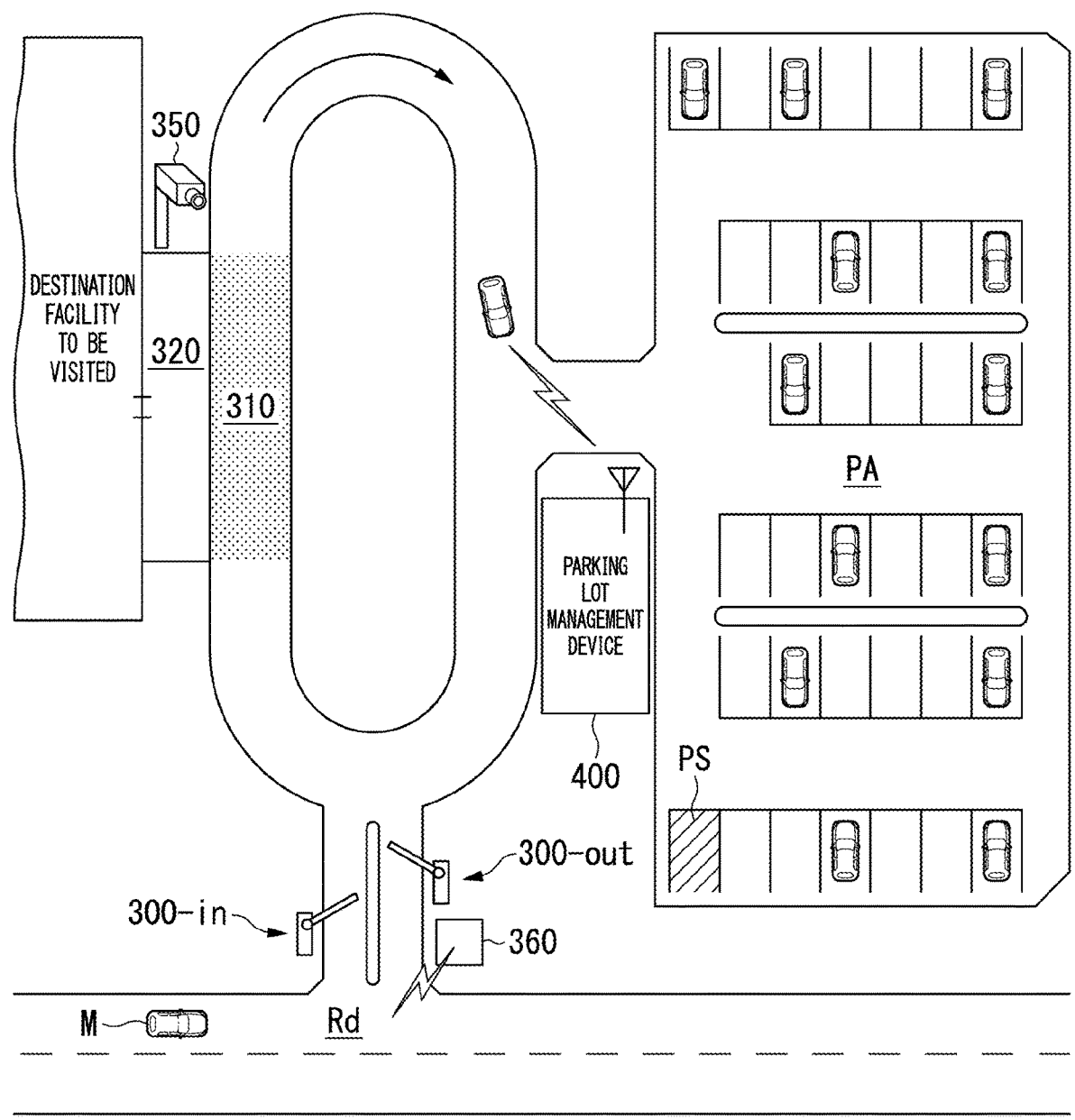
FIG. 3 is a diagram schematically showing a scene in which an autonomous parking event is executed.

FIG. 3 is a diagram schematically showing a scene in which the autonomous parking event is executed. An entrance gate 300-in, an exit gate 300-out, a getting-into/out-monitoring camera 350, and a gate communication device 360 are provided on a route from a road Rd to the destination facility to be visited. The destination facilities to be visited include, for example, shopping stores, restaurants, accommodation facilities such as hotels, airports, hospitals, and event venues, and the like.

The entrance gate 300-in and the exit gate 300-out are opened and closed in accordance with instructions of the parking lot management device 400.

The getting-into/out-monitoring camera 350 captures an image of the stopping area 310 or the getting-into/out area 320. The getting-into/out-monitoring camera 350 transmits the captured still image or moving image to the parking lot management device 400.

The gate communication device 360 is installed near the entrance gate 300-in, wirelessly communicates with the communication device 20 mounted in the vehicle approaching the entrance gate 300-in, and acquires various types of information from the communication device 20. The gate communication device 360 transmits the information acquired from the communication device 20 to the parking lot management device 400. The gate communication device 360 is an example of a "second communication device".

The stopping area 310 faces the getting-into/out area 320 connected to the destination facility to be visited and is an area where the vehicle is allowed to temporarily stop so that an occupant gets out of the vehicle in the getting-into/out area 320 or gets into the vehicle in the getting-into/out area 320.

The getting-into/out area 320 is an area provided for an occupant who gets out of the vehicle, an occupant who gets into the vehicle, or an occupant who waits at a place until the vehicle arrives. The getting-into/out area 320 is typically provided on one side of the road on which the stopping area 310 is provided. Eaves for avoiding rain, snow, and sunlight may be provided in the getting-into/out area 320. The stopping area 310 and the getting-into/out area 320 are examples of a "predetermined area".

Figure 4:
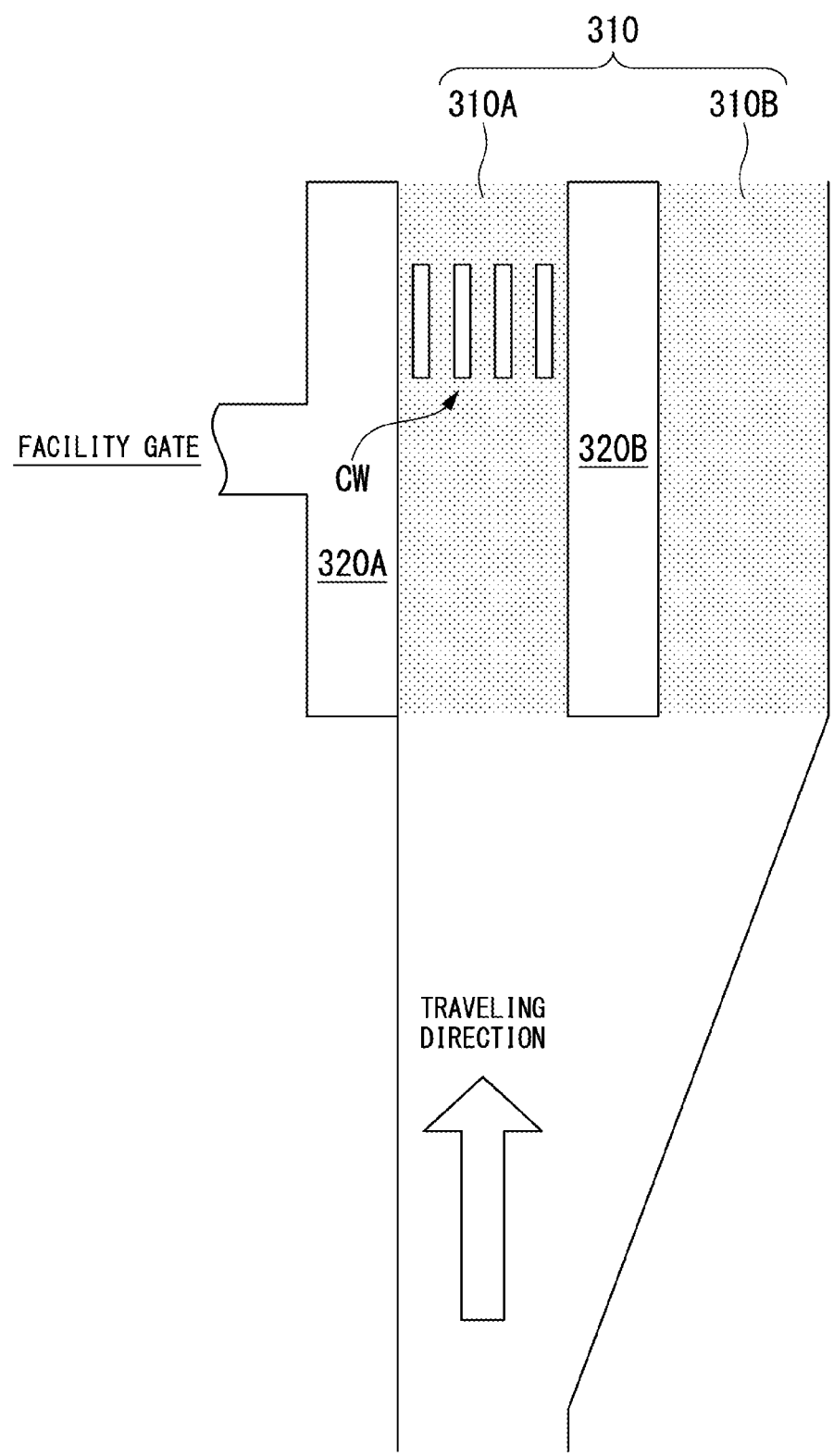
FIG. 4 is a diagram showing an example of a stopping area and a getting-into/out area.

FIG. 4 is a diagram showing an example of the stopping area 310 and the getting-into/out area 320. As in the example shown in FIG. 4, for example, a plurality of lanes having a width sufficient to allow a vehicle to pass is provided in the stopping area 310 and the getting-into/out area 320 are provided on one side of each lane. As in the example shown in FIG. 4, a first lane 310A and a second lane 310B are provided. A first getting-into/out area 320A connected to the gate of the facility is provided on the left side of the first lane 310A in the traveling direction and a second getting-into/out area 320B is provided on the left side of the second lane 310B in the traveling direction. A crosswalk CW is provided on the first lane 310A so that the user can safely move from the second getting-into/out area 320B to the first getting-into/out area 320A.

It is determined whether the vehicle is stopped in the first lane 310A or the second lane 310B according to the number of users using the vehicle. "Using the vehicle" means, for example, that the user gets out of the vehicle or that the user gets into the vehicle, and the "number of users" is the number of users scheduled to get out of the vehicle or the number of users scheduled to get into the vehicle. In other words, the "number of users using the vehicle" is the number of users who have already got into the vehicle at the time of arrival at the stopping area 310 or the number of users that are waiting to get into the vehicle in the getting-into/out area 320 or the like in a state in which they have not yet got into the vehicle at the time of arrival at the stopping area 310.

Because the lane where the vehicle is stopped in accordance with the number of users is determined, different waiting time periods occur in the first lane 310A and the second lane 310B when the stopping area 310 is congested. In other words, the first lane 310A and the second lane 310B have different vehicle stop time periods. For example, when the number of the users of the vehicle guided to the second lane 310B is larger than the number of the users of the vehicle guided to the first lane 310A, a time period required when the user gets into or out of the vehicle, i.e., a stop time period, is likely to be long on the second lane 310B and a longer waiting time period is likely to occur in a following vehicle scheduled to stop in the second lane 310B. Hereinafter, a lane having a longer waiting time period is referred to as a "long-term stay lane" and a lane having a shorter waiting time period is referred to as a "short-term stay lane". The short-term stay lane is an example of a "first lane" and the long-term stay lane is an example of a "second lane".

The description returns to FIG. 3. For example, the host vehicle M travels to the stopping area 310 through the entrance gate 300-in according to manual driving or automated driving.

The host vehicle M that has traveled to the stopping area 310 stops at the stopping area 310 and allows the occupant to get out of the host vehicle M in the getting-into/out area 320. Subsequently, the host vehicle M performs unmanned automated driving and starts the autonomous parking event in which the host vehicle M autonomously moves from the stopping area 310 to the parking space PS within the parking lot PA. A start trigger of the autonomous parking event may be, for example, a situation in which the host vehicle M has approached to within a predetermined distance of the destination facility to be visited, a situation in which the occupant has activated a dedicated application in a terminal device such as a portable phone, or a situation in which the communication device 20 has wirelessly received a predetermined signal from the parking lot management device 400.

When the autonomous parking event starts, the action plan generator 140 controls the communication device 20 so that the communication device 20 transmits a parking request to the parking lot management device 400. When there is a space where the vehicle can be parked in the parking lot PA, the parking lot management device 400 that has received the parking request transmits a predetermined signal as a response to the parking request to the vehicle of a transmission source of the parking request. The host vehicle M that has received the predetermined signal moves from the stopping area 310 to the parking lot PA in accordance with guidance of the parking lot management device 400 or while performing sensing on its own. Also, when the autonomous parking event is performed, the host vehicle M does not necessarily have to be unmanned and a staff member of the parking lot PA may get into the host vehicle M.

Figures 5, 6:
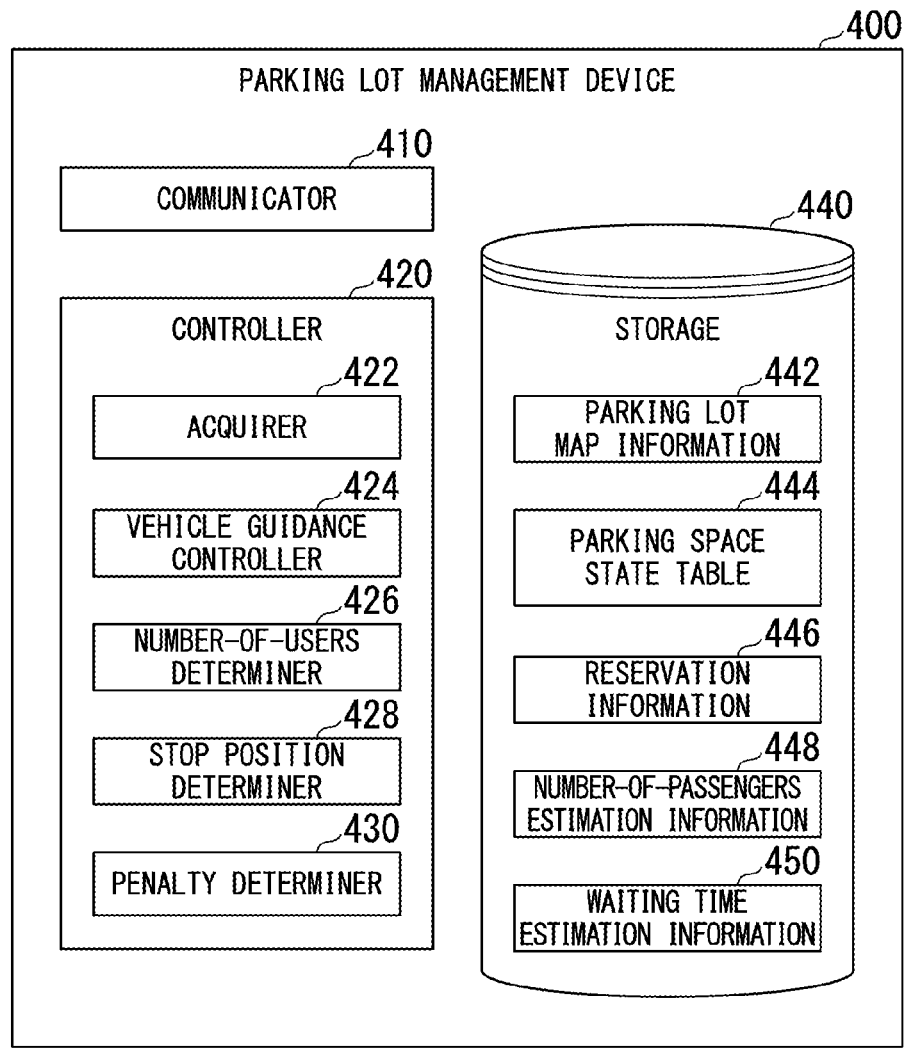
FIG. 5 is a diagram showing an example of a configuration of a parking lot management device.
FIG. 6 is a diagram showing an example of a parking space state table.

FIG. 5 is a diagram showing an example of a configuration of the parking lot management device 400. The parking lot management device 400 includes, for example, a communicator 410, a controller 420, and a storage 440. The parking lot management device 400 is an example of an "information-processing device".

The communicator 410 wirelessly communicates with the host vehicle M and other vehicles and wirelessly communicates with the entrance gate 300-in, the exit gate 300-out, the getting-into/out-monitoring camera 350, and the gate communication device 360.

The controller 420 includes, for example, an acquirer 422, a vehicle guidance controller 424, a number-of-users determiner 426, a stop position determiner 428, and a penalty determiner 430. The number-of-users determiner 426 is an example of a "first controller", the stop position determiner 428 is an example of a "second controller", and the penalty determiner 430 is an example of a "third controller".

Some or all of components of the controller 420 is implemented by, for example, a processor such as a CPU or a GPU executing a program (software). Some or all of components of the controller 420 may be implemented by hardware (a circuit including circuitry) such as LSI, an ASIC, and an FPGA or may be implemented by software and hardware in cooperation. The program may be pre-stored in an HDD, a flash memory, or the like of the storage 440 or may be stored in a removable storage medium such as a DVD or a CD-ROM and installed in the storage 440 when the storage medium is mounted in a drive device.

The storage 440 is implemented by, for example, an HDD, a flash memory, an EEPROM, a ROM, a RAM, or the like. The storage 190 stores, for example, various types of information such as parking lot map information 442, a parking space state table 444, and reservation information 446, number-of-passengers estimation information 448, and waiting time estimation information 450 in addition to programs to be read and executed by the processor. The number-of-passengers estimation information 448 and the waiting time estimation information 450 will be described below.

The parking lot map information 442 is information that geometrically represents the structure of the parking lot PA, and includes, for example, coordinates for each parking space PS.

FIG. 6 is a diagram showing an example of the parking space state table 444. As in the example shown in FIG. 6, the parking space state table 444 has information in which a state that is an empty state in which no vehicle is parked in the parking space indicated by the parking space ID or is a full (parked) state in which a vehicle is parked in the parking space indicated by the parking space ID and a vehicle ID that is identification information of a parked vehicle in the case of the full state are associated with the parking space ID that is identification information of the parking space PS.

Figures 7, 8:
FIG. 7 is a diagram showing an example of reservation information.
FIG. 8 is a diagram showing an example of a website on which the use of a destination facility to be visited can be reserved.

FIG. 7 is a diagram showing an example of the reservation information 446. As in the example shown in FIG. 7, the reservation information 446 is information in which an ID of a vehicle used by a user indicated by a user ID, a use time of a facility, and the number of users who will get into the vehicle when the facility is used are associated with the user ID for identifying the user scheduled to use the facility. For example, the user uses the HMI 30, a portable phone, a personal computer, a dedicated terminal installed in the destination facility to be visited, or the like to access a website on which the use of the destination facility to be visited can be reserved and input various types of information to be included in the reservation information 446. The HMI 30 is an example of a "terminal device available to the user" and a terminal device such as a portable phone, a personal computer, or a dedicated terminal within the destination facility to be visited is another example of the "terminal device available to the user".

FIG. 8 is a diagram showing an example of a website on which the use of the destination facility to be visited can be reserved. As shown in FIG. 8, an input field E1 to which a user's contact information can be input, an input field E2 to which a vehicle registration number can be input, an input field E3 to which a use time of a destination facility to be visited can be input, an input field E4 to which the number of users who will get into the vehicle can be input when the destination facility to be visited is used, and the like are displayed on the website. For example, on the accessed website, the user inputs personal information such as an e-mail address and a telephone number to the input field E1, inputs the vehicle registration number to the input field E2, inputs the use time of the destination facility to be visited to the input field E3, and inputs the number of users to the input field E4.

The acquirer 422 acquires these pieces of input information from a web server that provides the website and stores the acquired information as the reservation information 446 in the storage 440. These pieces of information may be input via an application that provides a service equivalent to that of the website. In this case, the acquirer 422 acquires these pieces of input information from an application server and stores the acquired information as the reservation information 446 in the storage 440.

The acquirer 422 acquires various types of requests including a parking request from a vehicle via the communication device 20 or acquires information indicating a detection result of the vehicle sensor 40.

The vehicle guidance controller 424 guides the vehicle to the parking space PS on the basis of the information acquired by the acquirer 422 and the information stored in the storage 440. When the acquirer 422 acquires the parking request, the vehicle guidance controller 424 extracts the parking space PS in the empty state with reference to the parking space state table 444 and acquires a position of the extracted parking space PS from the parking lot map information 442. The vehicle guidance controller 424 transmits route information indicating a suitable route to the acquired position of the parking space PS to the vehicle using the communicator 410. The vehicle guidance controller 424 may instruct a specific vehicle to stop or slow down as necessary on the basis of a positional relationship between a plurality of vehicles so that the vehicles do not move to the same position at the same time.

When the host vehicle M receives the route information from the parking lot management device 400, the action plan generator 140 generates a target trajectory based on the route. For example, the action plan generator 140 sets the target speed to a speed lower than a speed limit within the parking lot PA on a route from a current position of the host vehicle M to the parking space PS and generates a target trajectory in which trajectory points are arranged in the center of a road within the parking lot PA. When the host vehicle M approaches a target parking space PS, the recognizer 130 recognizes parking slot lines or the like that partition the parking space PS and recognizes a relative position of the parking space PS with respect to the host vehicle M. When the parking space PS is recognized, the recognizer 130 provides the action plan generator 140 with recognition results such as a direction of the recognized parking space PS (a direction of the parking space viewed from the host vehicle M) and a distance to the parking space PS. The action plan generator 140 corrects the target trajectory on the basis of the provided recognition results. The second controller 160 controls the steering and the speed of the host vehicle M in accordance with the target trajectory corrected by the action plan generator 140 so that the host vehicle M parks in the parking space PS.

[Autonomous Parking Event-when Leaving is Performed]

The action plan generator 140 and the communication device 20 maintain the operating state even if the host vehicle M is parked. For example, it is assumed that, after the occupant who has got out of the host vehicle M stopped in the stopping area 310 in the getting-into/out area 320 completes things to do in the destination facility to be visited, a dedicated application is activated by operating a terminal device and a pick-up request is transmitted to the parking lot management device 400. The pick-up request is a command for paging the host vehicle M from a remote place distant from the host vehicle M and requesting the host vehicle M to move to a position near the occupant.

The vehicle guidance controller 424 monitors the number of vehicles entering the stopping area 310 and transmits the pick-up request to the communication device 20 of the host vehicle M while performing arbitration so that vehicles do not overflow from the stopping area 310.

When the pick-up request is received by the communication device 20, the action plan generator 140 executes an autonomous parking event. The action plan generator 140 that has executed the autonomous parking event generates a target trajectory for causing the host vehicle M to move from the parking space PS where the host vehicle M is parked to the stopping area 310. The second controller 160 causes the host vehicle M to move to the stopping area 310 in accordance with the target trajectory generated by the action plan generator 140. For example, the action plan generator 140 may set a speed lower than the speed limit within the parking lot PA as the target speed on the route to the stopping area 310 and generate a target trajectory in which the trajectory points are arranged in the center of the road within the parking lot PA.

When the host vehicle M approaches the stopping area 310, the recognizer 130 recognizes the getting-into/out area 320 facing the stopping area 310 and recognizes a physical object such as a person or luggage present within the getting-into/out area 320. Further, the recognizer 130 recognizes the occupant of the host vehicle M from one or more persons present within the getting-into/out area 320. For example, when there are a plurality of persons within the getting-into/out area 320 and there are a plurality of occupant candidates, the recognizer 130 may distinguish and recognize an occupant of the host vehicle M and other occupants on the basis of a radio wave intensity of a terminal device possessed by the occupant of the host vehicle M and a radio wave intensity of an electronic key capable of locking or unlocking the host vehicle M. For example, the recognizer 130 may recognize a person having a highest radio wave intensity as the occupant of the host vehicle M. The recognizer 130 may distinguish and recognize the occupant of the host vehicle M and other occupants on the basis of a feature quantity of a face of each occupant candidate and the like. When the host vehicle M approaches the occupant of the host vehicle M, the action plan generator 140 corrects the target trajectory by further reducing the target speed or moving the trajectory point from the center of the road to a position close to the getting-into/out area 320. In response to this, the second controller 160 causes the host vehicle M to stop at a position close to the getting-into/out area 320 side within the stopping area 310.

The action plan generator 140 controls the communication device 20 so that the communication device 20 transmits a departure request to the parking lot management device 400 when a target trajectory is generated in response to a pick-up request. When the departure request is acquired by the acquirer 422, the vehicle guidance controller 424 instructs a specific vehicle to stop or slow down, as necessary, on the basis of a positional relationship between a plurality of vehicles so that the vehicles do not move to the same position at the same time as in the entering process. When the host vehicle M moves to the stopping area 310 and the occupant present in the getting-into/out area 320 gets into the host vehicle M, the action plan generator 140 causes the autonomous parking event to end. Subsequently, the automated driving control device 100 plans a merging event or the like in which the host vehicle M is allowed to move from the parking lot PA to a road in the city area and automated driving is performed, or the occupant manually drives the host vehicle M on his or her own, on the basis of the planned event.

The action plan generator 140 may find a parking space PS in the empty state on its own on the basis of a detection result of the camera 10, the radar device 12, the finder 14, or the physical object recognition device 16 independently of communication and cause the host vehicle M to be parked within the found parking space PS without being limited to the above description.

The number-of-users determiner 426 determines the number of users who have got into the vehicle (the number of users scheduled to get out of the vehicle) when the vehicle passes through the entrance gate 300-in on the basis of various types of information acquired by the acquirer 422. The number-of-users determiner 426 determines the number of users scheduled to get into the vehicle when the parked vehicle departs from the parking lot PA and goes to the stopping area 310 on the basis of various type of information acquired by the acquirer 422.

The stop position determiner 428 determines a position where a vehicle that passes through the entrance gate 300-in and goes to the stopping area 310 or a vehicle that departs from the parking lot PA and goes to the stopping area 310 is stopped within the stopping area 310 on the basis of a determination result of the number-of-users determiner 426.

The penalty determiner 430 determines that a penalty is to be given to a user of the vehicle that has performed the delay action in the lane within the stopping area 310. The delay action is, for example, an action in which a stop time period on the lane within the stopping area 310 is longer than or equal to a predetermined time period and the above-described waiting time period is longer than that when the delay action is not performed. The penalty may be, for example, an increase in a usage fee of the facility or the parking lot PA or a restriction on the use of the facility or the parking lot PA from the next time.

[Process Flow of Automated Driving Control Device at the Time of Entering]

Figure 9:
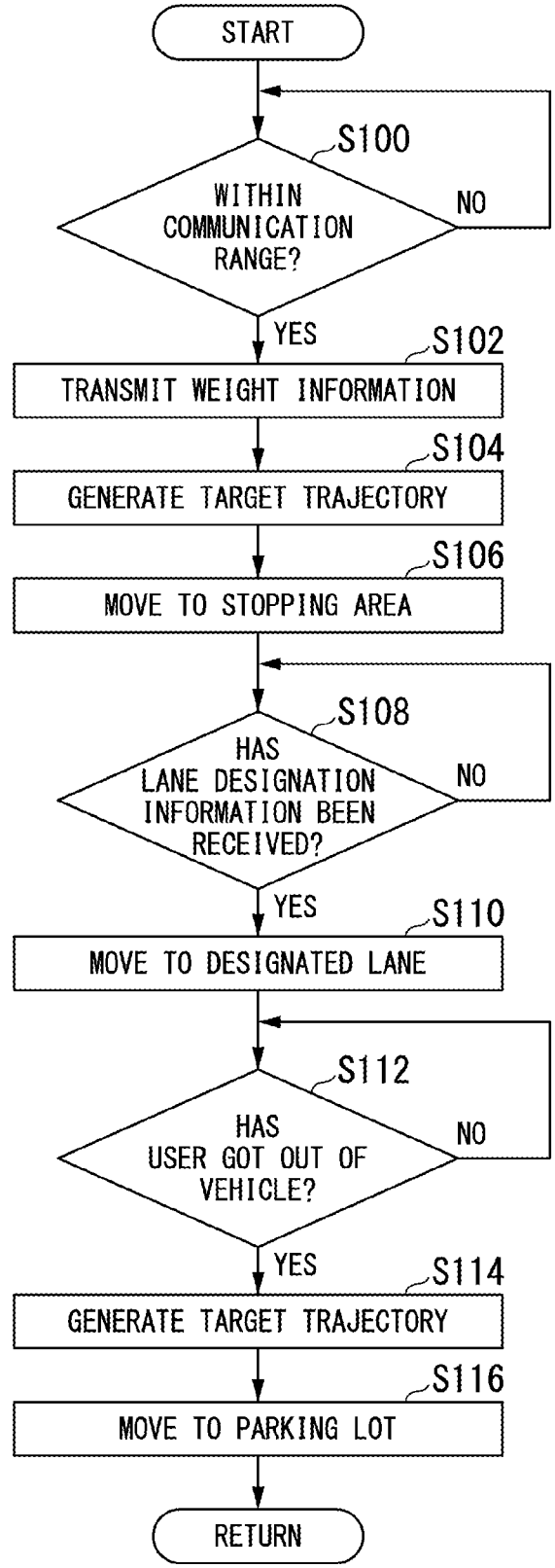
FIG. 9 is a flowchart showing an example of a series of processing steps of the automated driving control device according to the first embodiment.

Hereinafter, a series of processing steps of the automated driving control device 100 at the time of entering will be described with reference to a flowchart. FIG. 9 is a flowchart showing an example of a series of processing steps of the automated driving control device 100 according to the first embodiment. The process of the present flowchart is iteratively performed at predetermined time intervals. While the process of the present flowchart is performed, the recognizer 130 is assumed to continuously perform various types of recognition unless otherwise specified.

First, the communication controller 184 waits until the host vehicle M approaches the entrance gate 300-in and enters the communication range of the gate communication device 360 (step S100) and controls the communication device 20 so that the communication device 20 transmits information (hereinafter referred to as weight information) indicating detection results of the weight sensor 42 and the suspension sensor 44 to the gate communication device 360 when the host vehicle M has entered the communication range of the gate communication device 360 (step S102). The weight information includes, for example, a detected value detected by the weight sensor 42 or the suspension sensor 44 at a point in time before the user gets into the host vehicle M (for example, at the time of a reservation of the use of the facility or the like) and a detected value detected by the weight sensor 42 or the suspension sensor 44 at a point time after the user gets into the host vehicle M (for example, when the host vehicle M approaches the entrance gate 300-in or the like). When the weight information is received, the gate communication device 360 transfers the received weight information to the parking lot management device 400.

Next, the action plan generator 140 determines an autonomous parking event as an event of a route leading to the stopping area 310 and starts the autonomous parking event. The action plan generator 140 generates a target trajectory for causing the host vehicle M to move from the entrance gate 300-in to the stopping area 310 (step S104).

Next, the second controller 160 performs automated driving on the basis of the target trajectory generated by the action plan generator 140 and causes the host vehicle M to move to the stopping area 310 (step S106).

Next, the action plan generator 140 determines whether or not the communication device 20 has received lane designation information from the parking lot management device 400 (step S108). The lane designation information is information in which a lane where the vehicle is to be stopped among a plurality of lanes included in the stopping area 310 is designated.

When the communication device 20 has received the lane designation information from the parking lot management device 400, the action plan generator 140 generates a target trajectory for causing the host vehicle M to move to the designated lane. In response to this, the second controller 160 causes the host vehicle M to move to the designated lane and causes the host vehicle M to stop on the lane (step S110).

Next, the action plan generator 140 determines whether or not the user has got out of the host vehicle M (step S112). For example, the action plan generator 140 may determine whether or not the user has got out of the host vehicle M on the basis of a detection result of the door sensor that detects the opening and closing of the door of the host vehicle M and an image of the camera installed in the host vehicle M.

When the user has got out of the host vehicle M, the action plan generator 140 generates a target trajectory from the stopping area 310 to the parking lot PA (step S114). In response to this, the second controller 160 causes the host vehicle M to move to the parking lot PA according to the target trajectory and causes the host vehicle M to stop in the parking space PS of the parking lot PA (step S116). Thus, the process of the present flowchart ends.

[Process Flow of Parking Lot Management Device at the Time of Entering]

Figure 10:
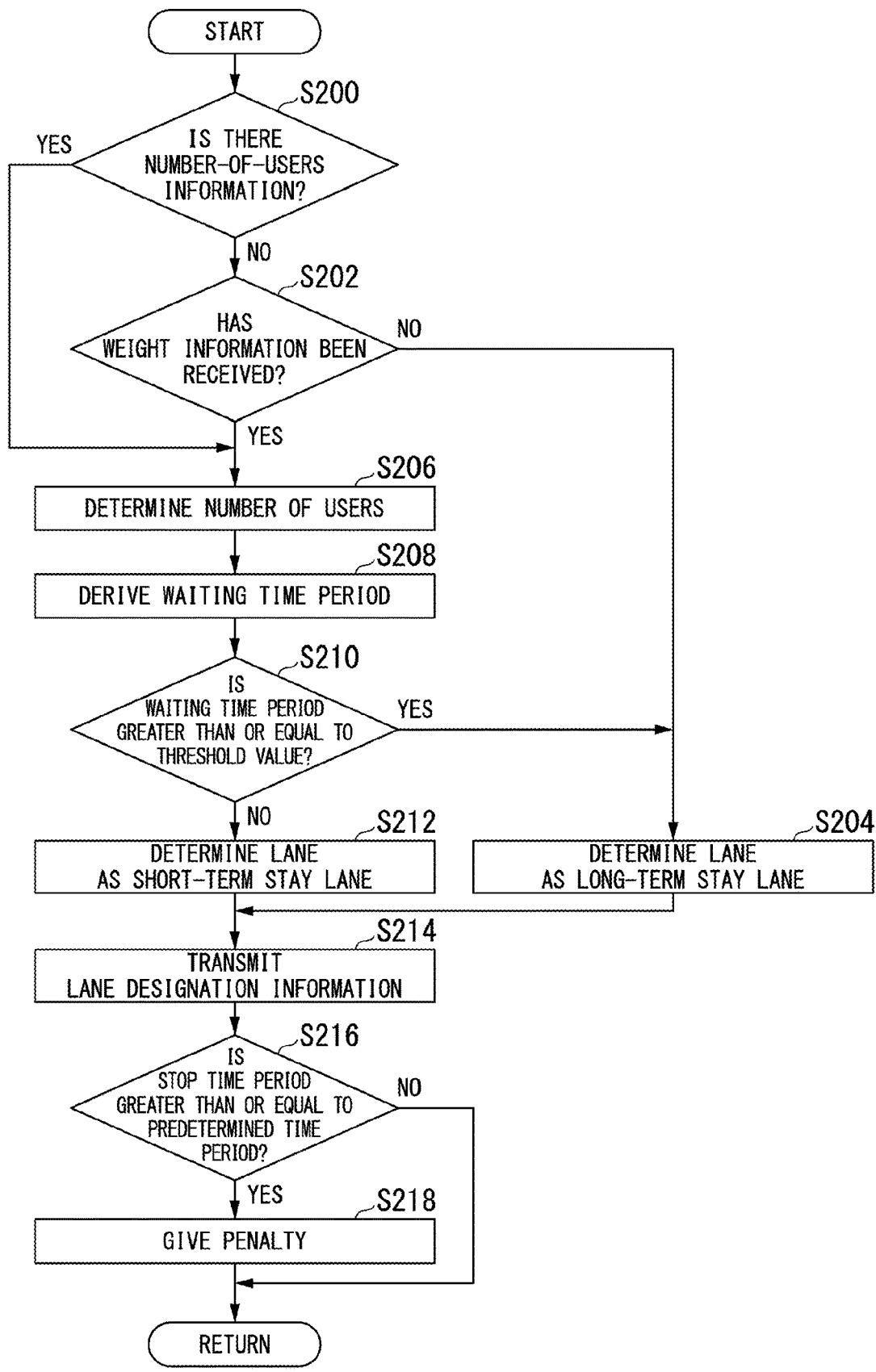
FIG. 10 is a flowchart showing an example of a series of processing steps of the parking lot management device according to the first embodiment.

Hereinafter, a series of processing steps of the parking lot management device 400 at the time of entering will be described with reference to a flowchart. FIG. 10 is a flowchart showing an example of a series of processing steps of the parking lot management device 400 according to the first embodiment. The process of the present flowchart is iteratively performed at predetermined time intervals.

First, the number-of-users determiner 426 determines whether the reservation information 446 includes information indicating the number of users using the facility to be visited (hereinafter referred to as number-of-users information) (step S200). That is, the number-of-users determiner 426 determines whether or not the user has registered the number of users who will use the facility, for example, on a website where the use of the facility can be reserved or the like. The number-of-users information is an example of "second information".

When the reservation information 446 does not include the number-of-users information, i.e., when the user has not registered the number of users before the facility is used, the number-of-users determiner 426 determines whether or not the communicator 410 has received the weight information from the gate communication device 360 (step S202). The weight information is an example of "first information".

When the reservation information 446 does not include the number-of-users information and the communicator 410 has not received the weight information from the gate communication device 360, the stop position determiner 428 determines a lane where a vehicle that has passed through the entrance gate 300-in should stop within the stopping area 310 as a long-term stay lane (step S204).

When the reservation information 446 includes the number-of-users information or when the communicator 410 has received the weight information from the gate communication device 360, the number-of-users determiner 426 determines the number of users that have got into the vehicle that has passed through the entrance gate 300-in (step S206).

For example, when the reservation information 446 includes the number-of-users information, the number-of-users determiner 426 determines that a number of users equal to the number of users indicated by the number-of-users information are in the vehicle that has passed through the entrance gate 300-in.

For example, when the communicator 410 has received the weight information, the user number determiner 426 determines the number of users that have got into the vehicle that has passed through the entrance gate 300-in with reference to the weight information and number-of-passengers estimation information 448.

Figure 11:
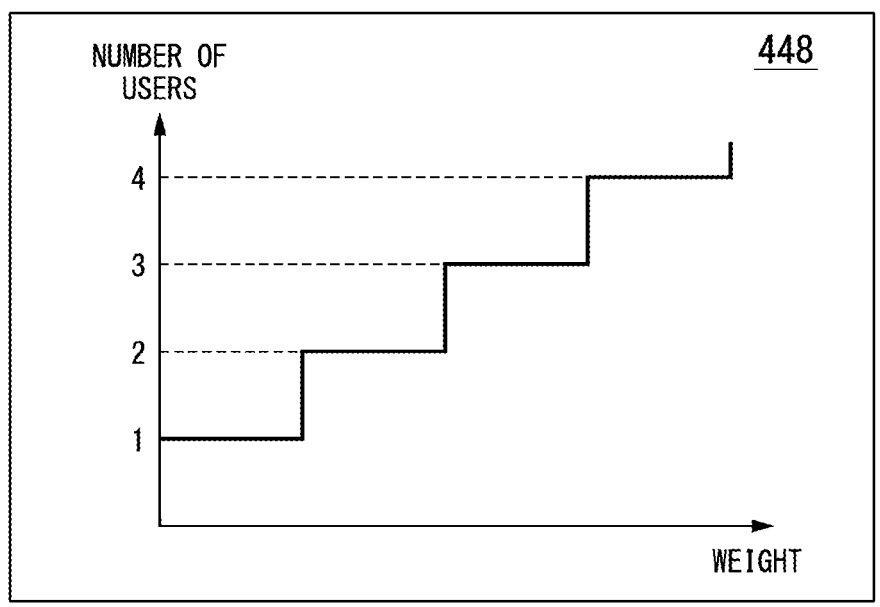
FIG. 11 is a diagram showing an example of number-of-passengers estimation information.

FIG. 11 is a diagram showing an example of the number-of-passengers estimation information 448. As shown in FIG. 11, the number-of-passengers estimation information 448 is information in which the number of users estimated to be in the vehicle is associated with a weight that the vehicle can take. As shown in FIG. 11, a relationship between the weight of the vehicle and the number of users may be represented by a step function or the like. For example, when the weight information includes a vehicle weight detected by the weight sensor 42 at a point in time before the user gets into the vehicle and a vehicle weight detected by the weight sensor 42 at a point in time after the user gets into the vehicle, the number-of-users determiner 426 determines the number of users in accordance with a difference between the weights. For example, when the weight information includes an amount of stroke detected by the suspension sensor 44 at a point in time before the user gets into the vehicle and an amount of stroke detected by the suspension sensor 44 after the user gets into the vehicle, the number-of-users determiner 426 estimates the weight of the vehicle from a difference between the amounts of stroke and further determines the number of users using the estimated weight.

The description returns to the flowchart of FIG. 10. Next, the stop position determiner 428 derives a waiting time period estimated to occur when the vehicle that has passed through the entrance gate 300-in has stopped in the stopping area 310 on the basis of the number of users determined by the number-of-users determiner 426 and the waiting time estimation information 450 (step S208).

Figure 12:
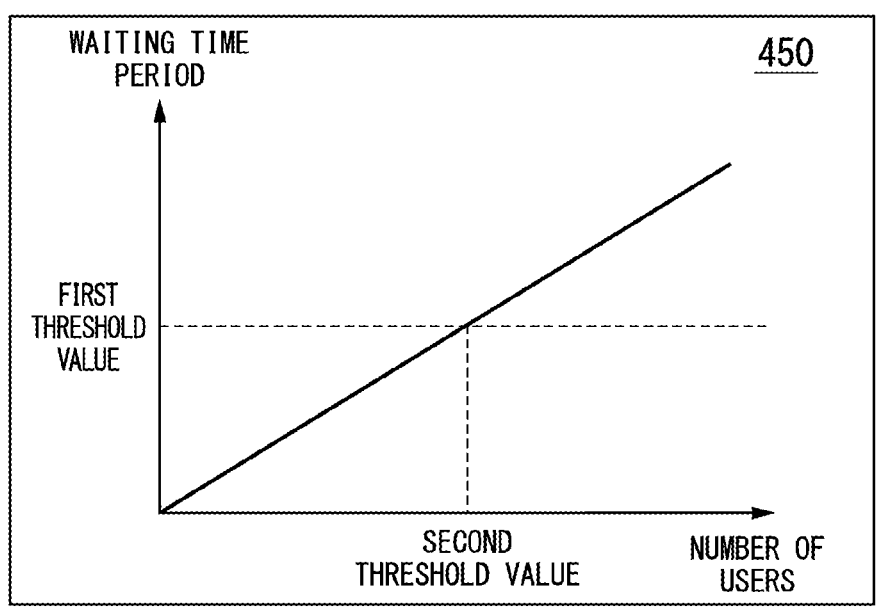
FIG. 12 is a diagram showing an example of waiting time estimation information.
Figure 13:
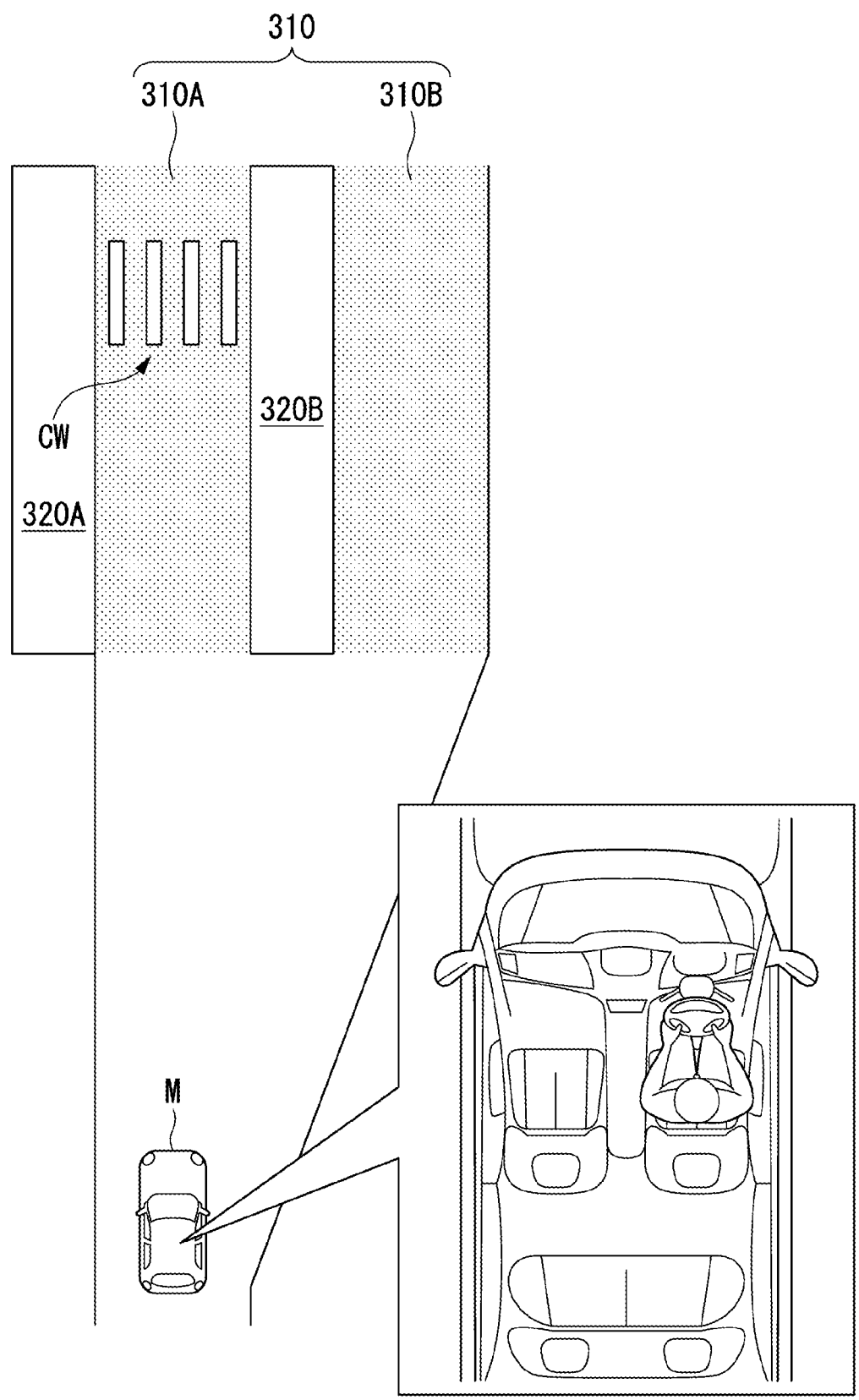
FIG. 13 is a diagram showing an example of a scene in which a host vehicle selects a lane.
Figure 14:
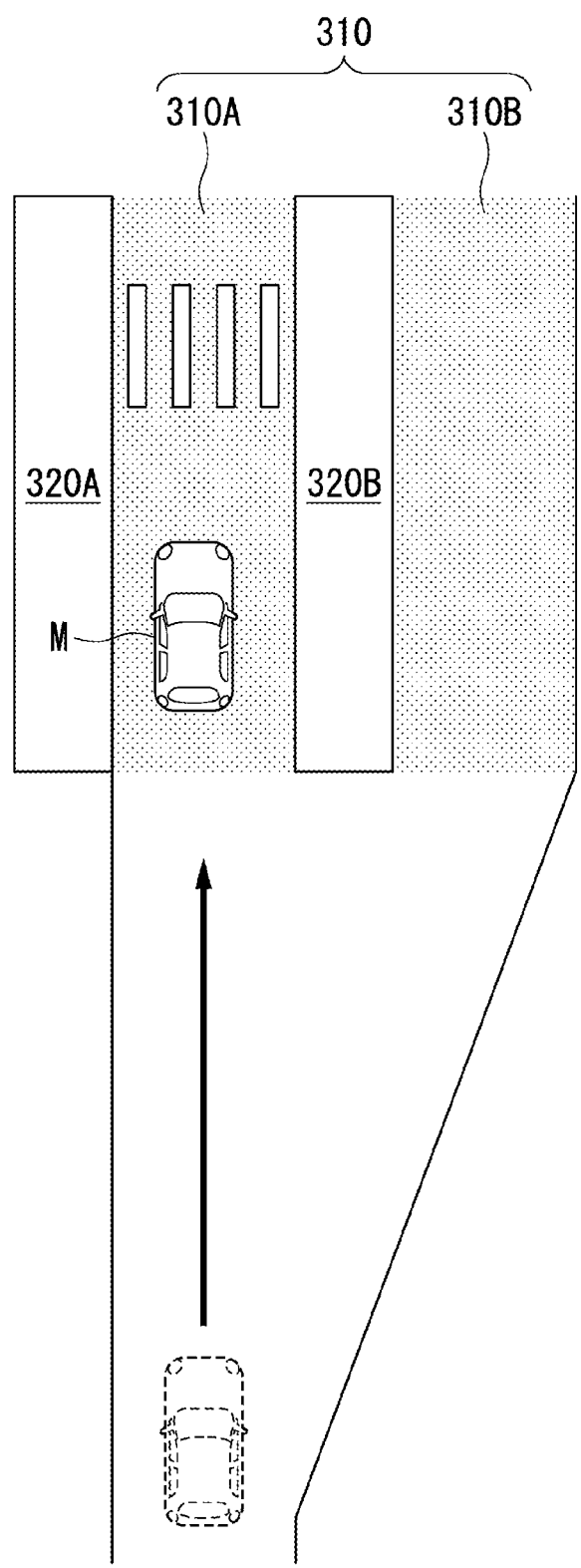
FIG. 14 is a diagram showing an example of a scene in which the host vehicle selects a lane.

FIG. 12 is a diagram showing an example of the waiting time estimation information 450. As shown in FIG. 12, the waiting time estimation information 450 is information in which a time period required when the user gets out of the vehicle is associated as the waiting time period with the number of users who have got into the vehicle. As shown in FIG. 12, the relationship between the number of users and the waiting time period may be represented by a linear function or the like. For example, the stop position determiner 428 derives the waiting time period in accordance with the determined number of users.

Next, the stop position determiner 428 determines whether the derived waiting time period is longer than or equal to the first threshold value (step S210). The first threshold value may be, for example, a time period of about several minutes or several tens of minutes.

When the waiting time period is longer than or equal to the first threshold value, the stop position determiner 428 proceeds to S204 and determines a lane where the vehicle that has passed through the entrance gate 300-in should stop within the stopping area 310 as the long-term stay lane. Thereby, the long-term stay lane is used by vehicles having a waiting time period that is likely to be greater than or equal to the first threshold value.

When the waiting time period is less than the first threshold value, the stop position determiner 428 determines a lane where the vehicle that has passed through the entrance gate 300-in should stop in the stopping area 310 as the short-term stay lane (step S212). Thereby, the short-term stay lane is used by vehicles having a waiting time period that is likely to be less than the first threshold value. That is, the number of vehicles using the short-term stay lane can be larger than the number of vehicles using the long-term stay lane for the same time period and the use frequency of the short-term stay lane becomes higher.

The stop position determiner 428 may further determine whether the short-term stay lane or the long-term stay lane is to be used in accordance with the number of users instead of a process of deriving the waiting time period on the basis of the number of users and determining whether the short-term stay lane or the long-term stay lane is to be used in accordance with the derived waiting time period.

In this case, for example, the stop position determiner 428 may determine whether the number of users determined by the number-of-users determiner 426 is greater than or equal to the second threshold value, determine that the long-term stay lane is to be used when the number of users is greater than or equal to the second threshold value, and determine that the short-term stay lane is to be used when the number of users is less than the second threshold value. For example, the second threshold value may be a natural number such as 2 or 3 exceeding 0. When a function indicating a relationship between the number of users and the waiting time period is a linear function and when the number of users is the same as the number of users set as the second threshold value, the waiting time period is the same as a time period set as the first threshold value.

The description returns to the flowchart of FIG. 10. Next, the vehicle guidance controller 424 transmits lane designation information indicating that a lane where the vehicle that has passed through the entrance gate 300-in should stop is a lane determined by the stop position determiner 428 to the vehicle that has passed through the entrance gate 300-in via the communicator 410 (step S214). Thereby, the vehicle that has passed through the entrance gate 300-in stops in either the short-term stay lane or the long-term stay lane.

FIGS. 13 to 16 are diagrams showing an example of a scene in which the host vehicle M selects a lane. In the scene shown in the example of FIG. 13, one user is in the host vehicle M. In the scene shown in the example of FIG. 13, the first lane 310A is set as a short-term stay lane and the second lane 310B is set as a long-term stay lane. In this case, for example, when the second threshold value is two, a lane where the host vehicle M should stop is designated as the first lane 310A that is the short-term stay lane. Accordingly, the host vehicle M moves to the first lane 310A and stops in the first lane 310A as in the scene shown in the example of FIG. 14.

Figure 15:
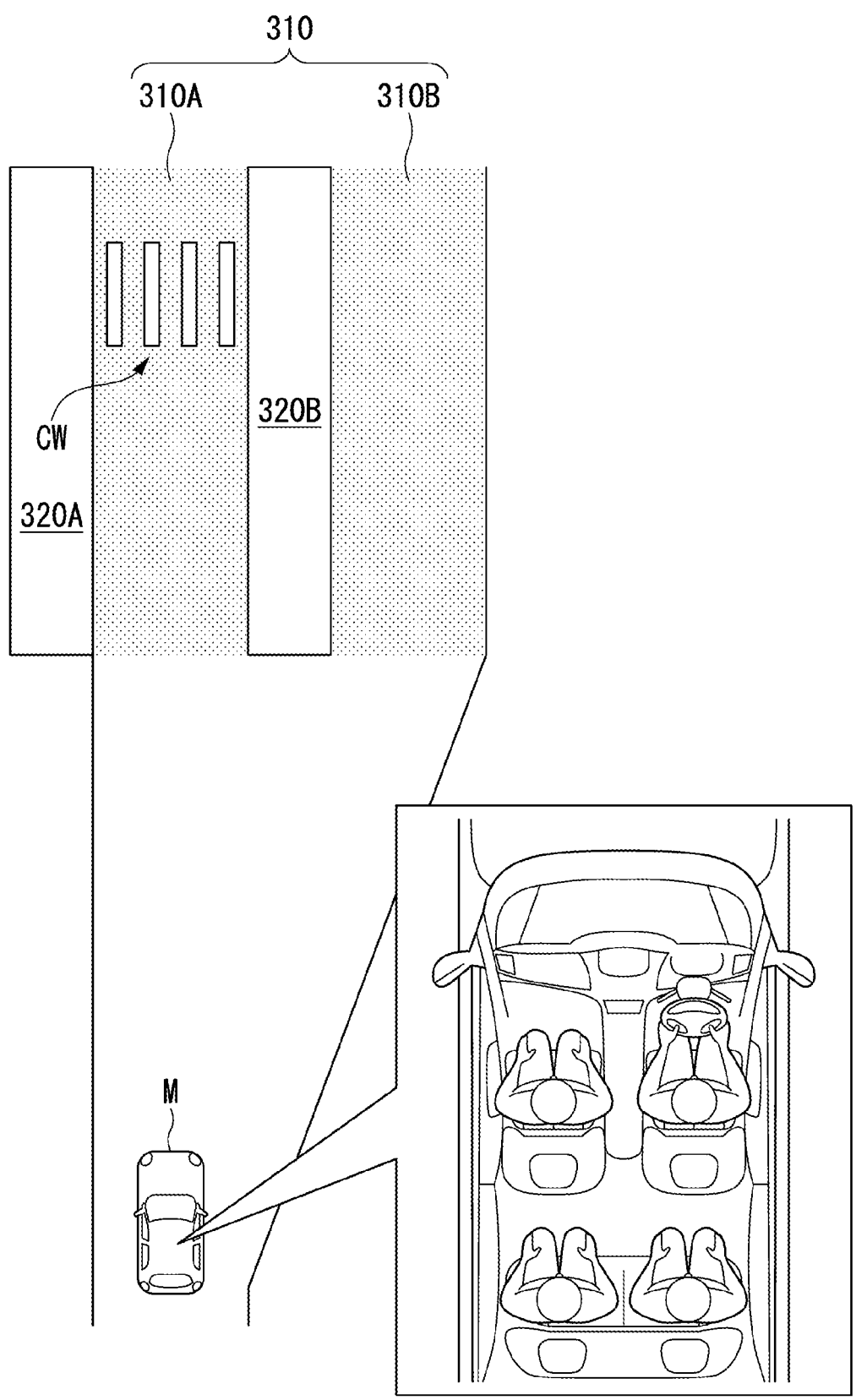
FIG. 15 is a diagram showing an example of a scene in which the host vehicle selects a lane.
Figure 16:
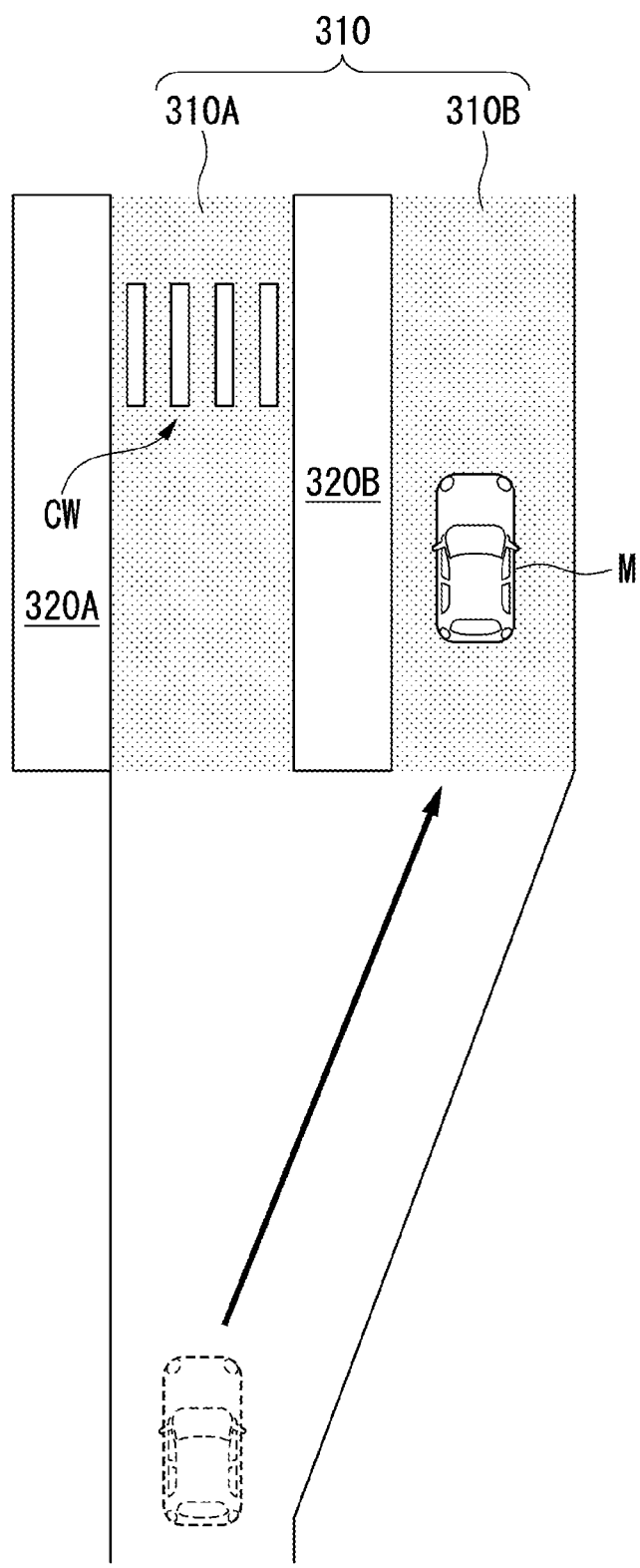
FIG. 16 is a diagram showing an example of a scene in which the host vehicle selects a lane.

On the other hand, in the scene shown in the example of FIG. 15, four users are in the host vehicle M. In this case, for example, when the second threshold value is two, the lane where the host vehicle M should stop is designated as the second lane 310B that is the long-term stay lane. Accordingly, the host vehicle M moves to the second lane 310B and stops in the second lane 310B as in the scene shown in the example of FIG. 16.

The description returns to the flowchart of FIG. 10. Next, the penalty determiner 430 determines whether or not an elapsed time period after the vehicle stops in the designated lane (hereinafter referred to as a stop time period) is longer than or equal to a predetermined time period (step S216). The predetermined time period may be set for each of the short-term stay lane and the long-term stay lane. For example, the predetermined time period of the short-term stay lane is set to a time period approximately equal to the first threshold value and the predetermined time period of the long-term stay lane is set to a time period that is longer than the time period determined to be the first threshold value. Specifically, the predetermined time period of the short-term stay lane is set to 5 minutes and the predetermined time period of the long-term stay lane is set to 10 minutes. These numerical values are merely examples and may be arbitrarily changed.

For example, the penalty determiner 430 may derive a stop time period by analyzing an image of the getting-into/out-monitoring camera 350 or derive a stop time period on the basis of a result of communication with the vehicle that has stopped in the lane.

When the stop time period is longer than or equal to the predetermined time period, the penalty determiner 430 determines that a delay action has occurred in the lane within the stopping area 310 and determines that a penalty is to be given to the user of the vehicle that has performed the delay action (step S218). Thereby, the process of the present flowchart ends.

Figure 17:
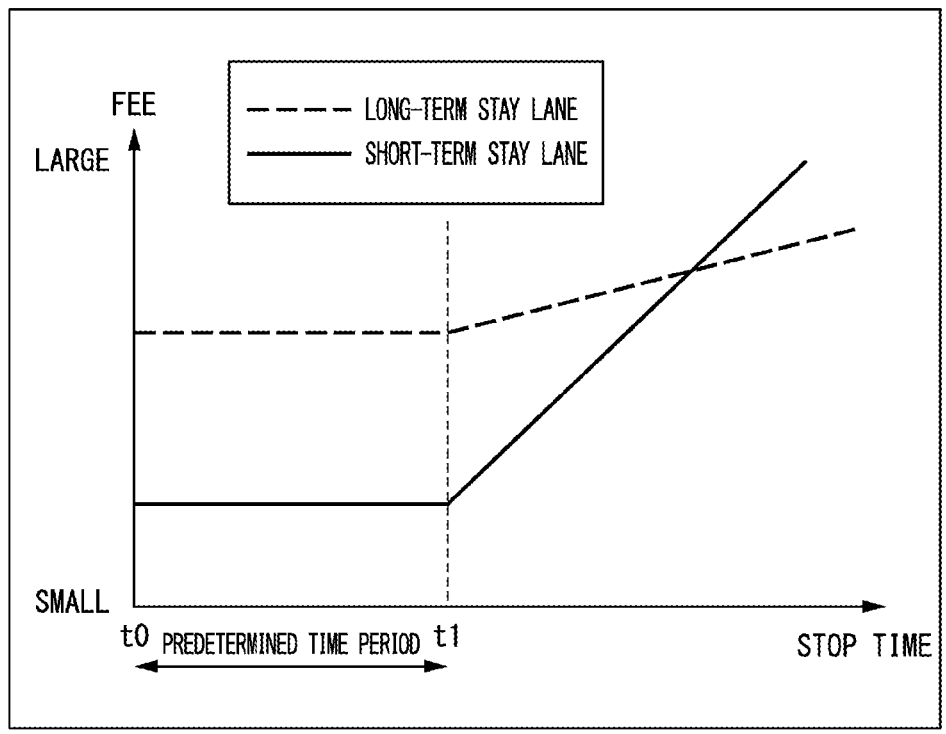
FIG. 17 is a diagram for describing a penalty determination method.

FIG. 17 is a diagram for describing a penalty determination method. In the example shown in FIG. 17, the penalty is a usage fee for the parking lot PA. For example, the penalty determiner 430 may make the fee uniform in a time period until a predetermined time period elapses from the stopping in the lane (a time period from time t0 to time t1)

and increase the fee by an extension of the stop time period in a time period after time t1 when the predetermined time period has elapsed.

The penalty determiner 430 may change the fee in accordance with a type of lane used by the vehicle. For example, the penalty determiner 430 may set a flat fee (a fixed fee) for the long-term stay lane that is larger than that for the short-term stay lane in the time period from time t0 to time t1 and may increase an amount of increase in a fee according to an extended time period for the short-term stay lane compared with the long-term stay lane in a time period after time t1. That is, the penalty determiner 430 may determine that a penalty heavier than a penalty for a user of a vehicle that has performed a delay action in the long-term stay lane is to be given to a user of a vehicle that has performed a delay action in the short-term stay lane.

As described above, the waiting time period affects a following vehicle behind a vehicle instead of the vehicle currently stopped in the lane. Accordingly, the penalty determiner 430 may determine the weight of the penalty according to the presence or absence of the following vehicle.

Figure 18:
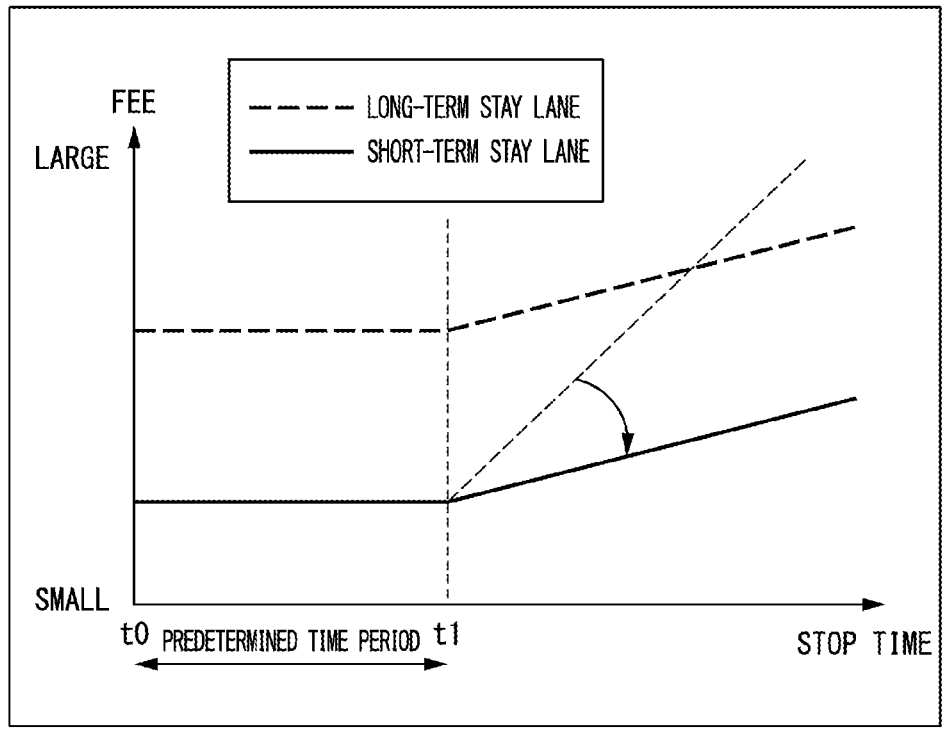
FIG. 18 is a diagram for describing the penalty determination method when there is a following vehicle.

FIG. 18 is a diagram for describing a penalty determination method when there is a following vehicle. As in the example shown in FIG. 18, when there is a following vehicle, the penalty determiner 430 may set an amount of increase in the fee of the short-term stay lane to an amount approximately equal to the amount of increase in the fee of the long-term stay lane in a time period after time t1. The penalty determiner 430 may also set a flat fee that does not change according to the stop time period if there is a following vehicle in the time period after time t1.

Although a case in which the parking lot management device 400 determines that the lane where the vehicle is stopped is either the short-term stay lane or the long-term stay lane in accordance with the number of users that have got into the vehicle (the number of users scheduled to get out of the vehicle) when the vehicle passes through the entrance gate 300-in and goes to the stopping area 310 has been described in the above-described description of the first embodiment, the present invention is not limited thereto. For example, when the user who has finished the use of the facility transmits a pick-up request to the parking lot management device 400 using a portable phone or the like, the parking lot management device 400 may cause the vehicle to depart from the parking lot PA in response to the pick-up request and determine that the lane where the vehicle is stopped is either the short-term stay lane or the long-term stay lane in accordance with the number of users scheduled to get into the vehicle allowed to go to the stopping area 310.

Although a lane where a vehicle is stopped within the stopping area 310 is determined on the basis of the number of users using the vehicle in the above description of the first embodiment, the present invention is not limited thereto. For example, the stop position determiner 428 may determine a lane where the vehicle is stopped in the stopping area 310 on the basis of a weight of the vehicle referred to for estimating the number of users. Specifically, when the weight of the vehicle indicated by the weight information is greater than or equal to the third threshold value, the stop position determiner 428 determines that a number of users greater than or equal to the second threshold value are in the vehicle and determines that a lane where the vehicle is stopped within the stopping area 310 is the long-term stay lane. When the weight of the vehicle indicated by the weight information is less than the third threshold value, the stop position determiner 428 determines that a number of users less than the second threshold value are in the vehicle and determines that a lane where the vehicle is stopped within the stopping area 310 is the short-term stay lane.

According to the first embodiment described above, the parking lot management device 400 determines the number of users that have got into the vehicle scheduled to enter the parking lot PA after passing through the entrance gate 300-in and going to the stopping area 310 or the number of users scheduled to get into the vehicle scheduled to pass through the exit gate 300-out after going from the parking lot PA to the stopping area 310 and determines a lane where the vehicle is stopped within the stopping area 310 provided along with the parking lot PA on the basis of the determined number of users. Then, the parking lot management device 400 transmits lane designation information in which the determined lane is designated as the lane where the vehicle should stop to the vehicle. In response to this, the automated driving control device 100 causes the host vehicle M to stop in the lane indicated by the lane designation information. As described above, it is possible to sufficiently effectively utilize a limited area of the parking lot PA because the vehicle is guided to the short-term stay lane with a short waiting time period or the long-term stay lane with a long waiting time period in accordance with the number of users.

Modified Example of First Embodiment

Hereinafter, a modified example of the first embodiment will be described. In the modified example of the first embodiment, the stop position determiner 428 determines either the short-term stay lane or the long-term stay lane as a lane where a vehicle is stopped on the basis of a time period required when the user gets into the vehicle or a time period required when the user gets out of the vehicle at a timing before the vehicle passes through the entrance gate 300-in.

The timing before the vehicle passes through the entrance gate 300-in is, for example, a timing when the user gets into the vehicle stopped at home, a timing when the user gets out of the vehicle stopped at home, or the like. At the timing when the user gets into the vehicle stopped at home, for example, any one functional unit (for example, the communication controller 184) of the third controller 180 of the automated driving control device 100 causes the storage 190 to store a time period from the time when the door of the host vehicle M stopped at home is unlocked, the door is opened, or the engine is activated to the time when the parking brake is released or the speed of the host vehicle M becomes 0 [km/h] or more (hereinafter referred to as a getting-into time period). The user may input a time period required to get into or out of the vehicle at home or the like on a website where the use of a destination facility to be visited can be reserved. That is, the user may apply in advance for the time period required to get into or out of the vehicle at home or the like when the use of the facility is reserved.

When the host vehicle M approaches the entrance gate 300-*in* and enters the communication range of the gate communication device 360, information indicating the time period required to get into or out of the vehicle at home or the like is transmitted to the gate communication device 360 via the communication device 20 instead of or in addition to transmitting the weight information.

Thereby, the acquirer 422 of the parking lot management device 400 acquires the weight information of the vehicle that has passed through the entrance gate 300-in and the information indicating the getting-into time period or the getting-out time period via the gate communication device 360. When the user has input the getting-into time period or the getting-out time period in advance on the website or the like, the acquirer 422 may acquire information indicating the getting-into time period or the getting-out time period from the web server or the like.

When the acquirer 422 acquires the information indicating the getting-into time period or the getting-out time period of the vehicle that has passed through the entrance gate 300-in, the stop position determiner 428 determines either the short-term stay lane or the long-term stay lane as a lane where the vehicle, which has passed through the entrance gate 300-in, is stopped on the basis of the information.

For example, the stop position determiner 428 determines the long-term stay lane as the lane where the vehicle should stop when the getting-into time period of the vehicle is greater than or equal to the first threshold value and determines the short-term stay lane as the lane where the vehicle should stop when the getting-into time period of the vehicle is less than the first threshold value. In this manner, as in the above-described embodiment, it is possible to sufficiently effectively utilize a limited area of the parking lot PA because the stop position of the vehicle is determined on the basis of the assumption that a time period required to get into or out of the vehicle at home is the same as a time period required to get into or out of the vehicle in the getting-into/out area 320.

Second Embodiment

Hereinafter, a second embodiment will be described. In the above-described first embodiment, a case in which a total of two lanes of the first lane 310A and the second lane 310B are provided in the stopping area 310 has been described. On the other hand, the second embodiment is different from the first embodiment in that three or more lanes are provided in the stopping area 310. Hereinafter, differences from the first embodiment will be mainly described and the description of points shared with the first embodiment will be omitted. In the description of the second embodiment, parts that are the same as those of the first embodiment are denoted by the same reference numerals and described.

Figure 19:
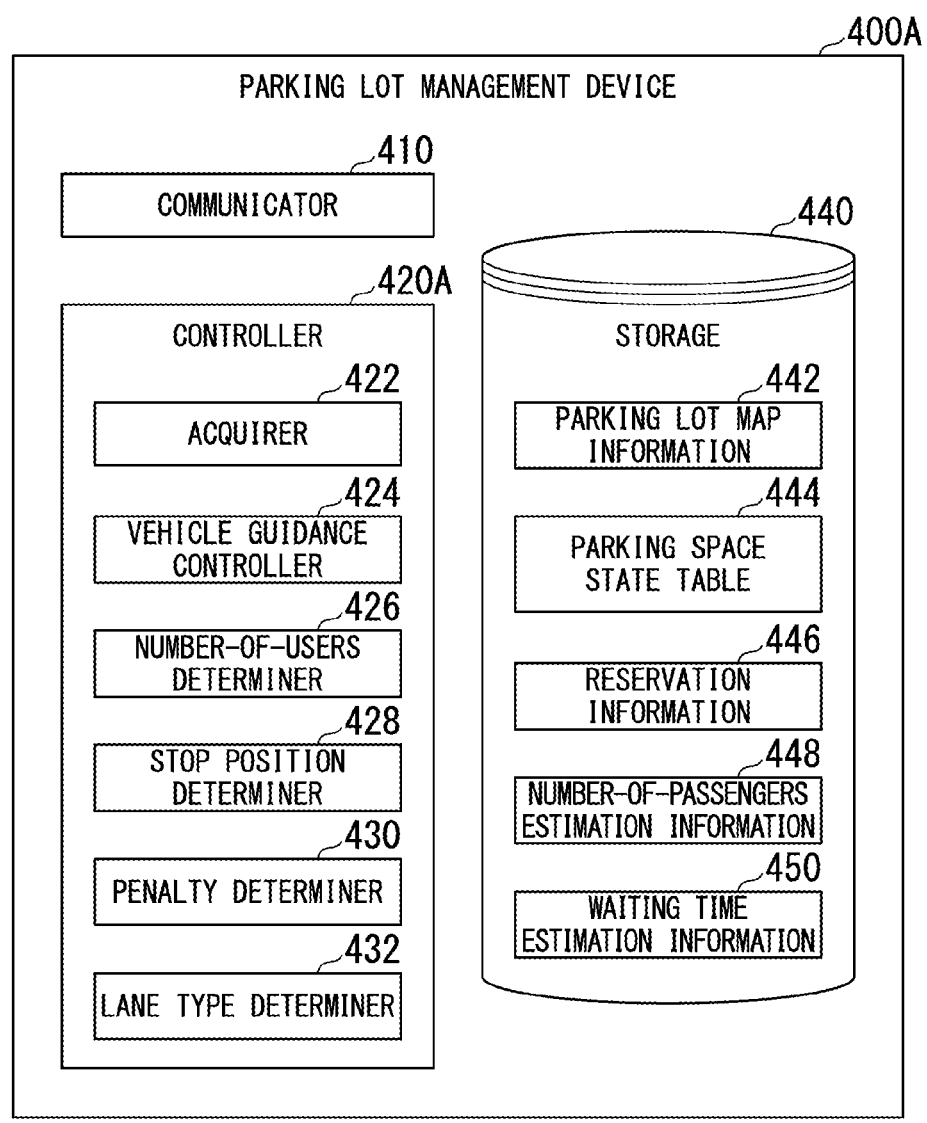
FIG. 19 is a diagram showing an example of a parking lot management device according to a second embodiment.

FIG. 19 is a diagram showing an example of a parking lot management device 400A according to the second embodiment. A controller 420A of the parking lot management device 400A according to the second embodiment further includes a lane type determiner 432 in addition to the acquirer 422, the vehicle guidance controller 424, the number-of-users determiner 426, the stop position determiner 428, and the penalty determiner 430 described above. The lane type determiner 432 is an example of a "fourth controller".

The lane type determiner 432 determines whether each lane is a short-term stay lane or a long-term stay lane on the basis of a use state of each of the three or more lanes provided in the stopping area 310. For example, the lane type determiner 432 may determine the use state of each lane by analyzing an image of a getting-into/out-monitoring camera 350.

Figure 20:
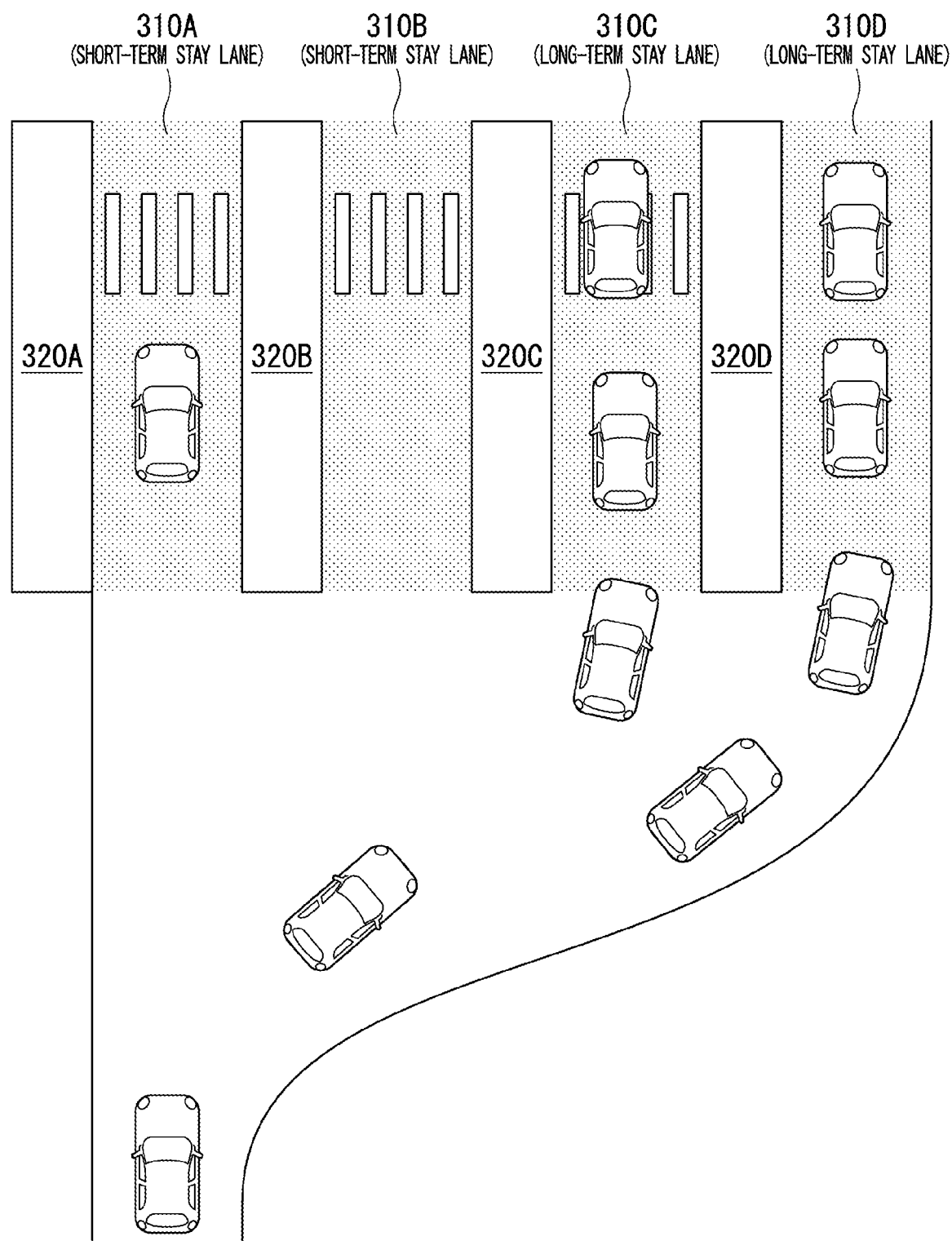
FIG. 20 is a diagram showing an example of a stopping area where four lanes are provided.

FIG. 20 is a diagram showing an example of the stopping area 310 including four lanes. In FIG. 20, reference sign 310A denotes a first lane, reference sign 310B denotes a second lane, reference sign 310C denotes a third lane, and reference sign 310D denotes a fourth lane. Among these four lanes, the first lane 310A and the second lane 310B are set as short-term stay lanes and the third lane 310C and the fourth lane 310D are set as long-term stay lanes.

For example, when the vehicle has been guided to the short-term stay lane or the long-term stay lane according to the number of users using the vehicle as in the above-described first embodiment, a bias in which vehicles are concentrated on any one lane may occur. In the example shown in FIG. 20, vehicles are intensively guided to the third lane 310C and the fourth lane 310D that are long-term stay lanes and the long-term stay lane is more congested than the short-term stay lane.

In this case, the lane type determiner 432 determines a ratio between the number of lanes that are short-term stay lanes and the number of lanes that are long-term stay lanes among the four lanes in accordance with use situations of the short-term stay lane and the long-term stay lane. Specifically, the lane type determiner 432 increases the number of long-term stay lanes that are more congested than the short-term stay lanes.

Figure 21:
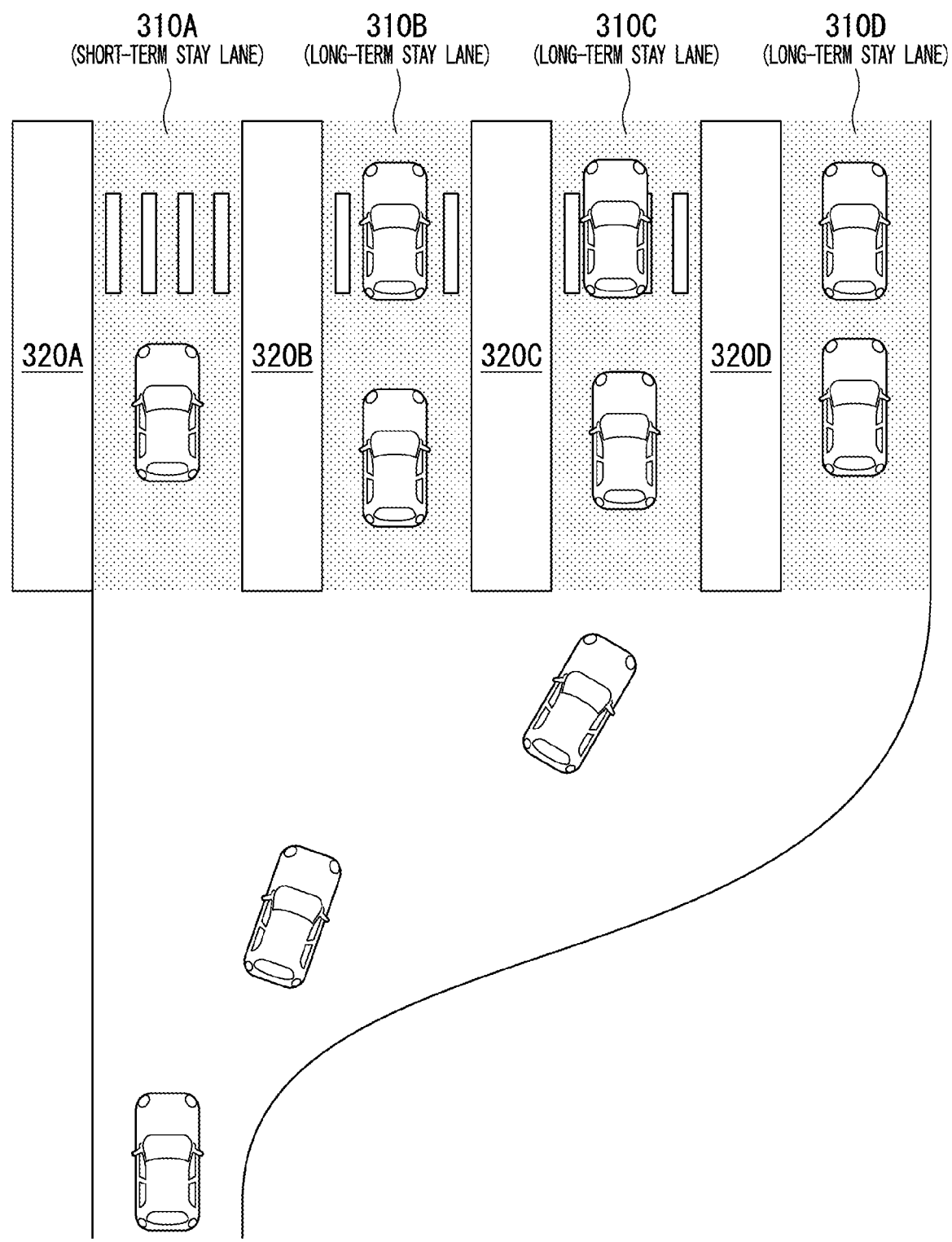
FIG. 21 is a diagram showing another example of a stopping area where four lanes are provided.

FIG. 21 is a diagram showing another example of the stopping area 310 where four lanes are provided. In the example shown in FIG. 21, the lane type determiner 432 changes the second lane 310B set as the short-term stay lane to the long-term stay lane. Thereby, congestion in the long-term stay lane can be reduced and a total waiting time period of the entire stopping area 310 can be shortened.

The lane type determiner 432 may re-determine a threshold value that is a boundary between a waiting time period of the short-term stay lane and a waiting time period of the long-term stay lane, i.e., a first threshold value, instead of or in addition to determining a ratio between the number of short-term stay lanes and the number of long-term stay lanes, in accordance with the usage states of the short-term stay lane and the long-term stay lane. The lane type determiner 432 may re-determine a threshold value of the number of users to be referred to when the vehicle is allocated to either the short-term stay lane or the long-term stay lane, i.e., a second threshold value.

According to the second embodiment described above, congestion in the stopping area 310 can be reduced because it is dynamically determined whether each lane is set as a short-term stay lane or a long-term stay lane on the basis of the use state of each of the plurality of lanes provided in the stopping area 310. As a result, it is possible to further sufficiently effectively utilize a limited area of the parking lot PA because the waiting time period in the stopping area 310 is reduced.

[Hardware Configuration]

Figure 22:
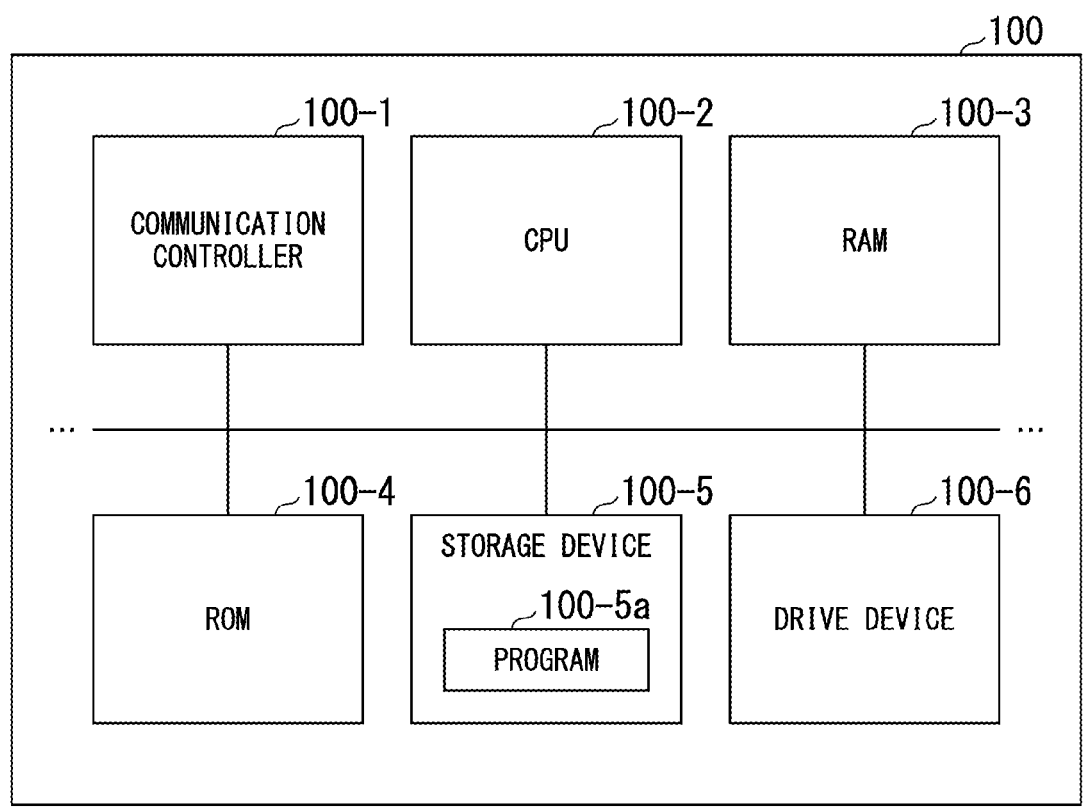
FIG. 22 is a diagram showing an example of a hardware configuration of the automated driving control device according to the embodiment.

FIG. 22 is a diagram showing an example of a hardware configuration of the automated driving control device 100 according to the embodiment. As shown in FIG. 22, the automated driving control device 100 has a configuration in which a communication controller 100-1, a CPU 100-2, a RAM 100-3 used as a working memory, a ROM 100-4 storing a boot program and the like, a storage device 100-5 such as a flash memory or a HDD, a drive device 100-6, and the like are mutually connected by an internal bus or a dedicated communication line. The communication controller 100-1 communicates with components other than the automated driving control device 100. The storage device 100-5 stores a program 100-5a to be executed by the CPU 100-2. This program is loaded into the RAM 100-3 by a direct memory access (DMA) controller (not shown) or the like and executed by the CPU 100-2. Thereby, some or all of the first controller 120, the second controller 160, and the third controller 180 are implemented.

The embodiment described above can be represented as follows.

An information-processing device, including:
at least one memory storing a program; and
at least one processor,
wherein the processor executes the program to:
determine the number of users using a vehicle that enters or leaves a parking lot or a weight of the vehicle; and
determine a position where the vehicle is stopped within a predetermined area of the parking lot on the basis of the number of users or the weight that has been determined.

Although modes for carrying out the present invention have been described using embodiments, the present invention is not limited to the embodiments, and various modifications and substitutions can also be made without departing from the scope and spirit of the present invention.

What is claimed is:

1. An information-processing device, comprising:
a processor; and
a memory that stores executable instructions that, when executed by the processor, facilitate performance of operations, comprising:
determining:
a number of users that are using a vehicle, wherein the vehicle enters or leaves a parking lot, or
a weight of the vehicle; and
determining a position where the vehicle is stopped within a predetermined area of the parking lot on the basis of:
the number of users, or
the weight.

2. The information-processing device according to claim 1,
wherein a plurality of lanes are provided in the predetermined area, and wherein the operations further comprise:
determining a first lane as a stop position of the vehicle when the number of users or the weight is less than a threshold value, and
determining a second lane having a longer stop time period of the vehicle than the first lane as the stop position of the vehicle when the number of users or the weight is greater than or equal to the threshold value.

3. The information-processing device according to claim 1,
wherein a plurality of lanes are provided in the predetermined area, and wherein the operations further comprise:
determining a first lane as a stop position of the vehicle when a stop time period of the vehicle according to the number of users or the weight is less than a threshold value, and
determining a second lane having a longer stop time period than the first lane as the stop position of the vehicle when the stop time period of the vehicle according to the number of users or the weight is greater than or equal to the threshold value.

4. The information-processing device according to claim 2, wherein the operations further comprise:
determining that a penalty is to be given to a user of a vehicle that has performed a delay action in the first lane or the second lane.

5. The information-processing device according to claim 4, wherein the operations further comprise:
determining that the penalty is to be given to the user of the vehicle that has performed the delay action in which at least a stop time period on the first lane is longer than or equal to a predetermined time period.

6. The information-processing device according to claim 5, wherein the operations further comprise:
restricting the penalty from being given to a user of a vehicle that has performed the delay action in the first lane when there is no other vehicle following a vehicle stopped in the first lane.

7. The information-processing device according to claim 5, wherein the operations further comprise:
determining that a heavier penalty is to be given to a user of a vehicle that has performed the delay action when a stop time period on the first lane is longer.

8. The information-processing device according to claim 4, wherein the operations further comprise:
determining that a penalty heavier than a penalty given to a user of a vehicle that has performed the delay action in the second lane is to be given to a user of a vehicle that has performed the delay action in the first lane.

9. The information-processing device according to claim 2, wherein the operations further comprise:
determining a ratio between a number of first lanes and a number of second lanes among the plurality of lanes on the basis of a use situation of each of the plurality of lanes.

10. The information-processing device according to claim 2, wherein the operations further comprise:
determining threshold values of a stop time period on the first lane and a stop time period on the second lane on the basis of a use situation of each of the plurality of lanes.

11. The information-processing device according to claim 1, wherein the operations further comprise:
determining the number of users or the weight on the basis of first information in response to receiving, from an external device, the first information, wherein the first information comprises information about a weight of a vehicle that enters the parking lot.

12. The information-processing device according to claim 1, wherein the operations further comprise:
determining the number of users on the basis of second information in response to receiving, from an external device, the second information, wherein the second information comprises information about the number of users scheduled to get into a vehicle that enters the parking lot.

13. The information-processing device according to claim 1, wherein the operations further comprise:
determining a position where the vehicle is stopped within the predetermined area on the basis of a time period required when a user gets into the vehicle or a time period required when the user gets out of the vehicle at a timing before the vehicle enters the parking lot.

14. A vehicle control device, comprising:
a processor; and
a memory that stores executable instructions that, when executed by the processor, facilitate performance of operations, comprising:
recognizing a surrounding situation of a host vehicle;
causing the host vehicle to stop in a predetermined area of a parking lot by controlling, on the basis of the surrounding situation, at least one of:
steering of the host vehicle, or
a speed of the host vehicle; and
determining a position where the host vehicle is stopped within the predetermined area on the basis of:
a number of users that are using the host vehicle, or
a weight of the host vehicle.

15. The vehicle control device according to claim 14,
wherein a plurality of lanes are provided in the predetermined area, and wherein the operations further comprise:
causing the host vehicle to stop in a first lane when the number of users or the weight is less than a threshold value; and
causing the host vehicle to stop in a second lane having a longer stop time period of the vehicle than the first lane when the number of users or the weight is greater than or equal to the threshold value.

16. An information-processing method, comprising:
determining, by a computer,
a number of users that are using a vehicle, wherein the vehicle enters or leaves a parking lot,
or a weight of the vehicle; and determining, by the computer, a position where the vehicle is stopped within a predetermined area of the parking lot on the basis of:
the number of users, or
the weight that has been determined.

17. A computer-readable non-transitory storage medium storing a program for causing a computer to:
determine:
a number of users using a vehicle, wherein the vehicle enters or leaves a parking lot, or
a weight of the vehicle; and
determine a position where the vehicle is stopped within a predetermined area of the parking lot on the basis of:
the number of users, or
the weight that has been determined.

* * * * *